(12) United States Patent
Bent et al.

(10) Patent No.: US 8,290,861 B1
(45) Date of Patent: *Oct. 16, 2012

(54) SYSTEMS AND METHODS FOR PROVIDING ENHANCED ACCOUNT MANAGEMENT SERVICES FOR MULTIPLE BANKS

(75) Inventors: Bruce Bent, Manhasset, NY (US); Bruce Bent, II, New York, NY (US)

(73) Assignee: Island Intellectual Property LLC, New York, NY (US)

( * ) Notice: Subject to any disclaimer, the term of this patent is extended or adjusted under 35 U.S.C. 154(b) by 416 days.

This patent is subject to a terminal disclaimer.

(21) Appl. No.: 12/453,389

(22) Filed: May 8, 2009

Related U.S. Application Data

(63) Continuation of application No. 10/382,946, filed on Mar. 6, 2003, now Pat. No. 7,536,350, which is a continuation-in-part of application No. 10/071,053, filed on Feb. 8, 2002, now Pat. No. 7,519,551, and a continuation-in-part of application No. 09/677,535, filed on Oct. 2, 2000, now Pat. No. 7,752,129, which is a continuation-in-part of application No. 09/176,340, filed on Oct. 21, 1998, now Pat. No. 6,374,231.

(60) Provisional application No. 60/442,849, filed on Jan. 27, 2003.

(51) Int. Cl.
*G06Q 40/00* (2012.01)
(52) U.S. Cl. ............................................. 705/39; 705/35
(58) Field of Classification Search .................... 705/35, 705/39
See application file for complete search history.

(56) References Cited

U.S. PATENT DOCUMENTS

| | | | |
|---|---|---|---|
| 4,232,367 A | 11/1980 | Youden et al. |
| 4,346,442 A | 8/1982 | Musmanno |
| 4,376,978 A | 3/1983 | Musmanno |
| 4,597,046 A | 6/1986 | Musmanno et al. |
| 4,674,044 A | 6/1987 | Kalmus et al. |
| 4,694,397 A | 9/1987 | Grant et al. |
| 4,700,297 A | 10/1987 | Hagel et al. |

(Continued)

FOREIGN PATENT DOCUMENTS

JP 10-049590 2/1998

(Continued)

OTHER PUBLICATIONS

Lawsuit by *Island Intellectual Property LLC, et al. v. Deutsch Bank Trust Company Americas, et al.*; Defendant Deutsche Bank Trust Company Americas' Second Supplemental Responses to Double Rock's Interrogatories Nos. 2, 8 and 9, Jul. 2010, 65 pages.

(Continued)

*Primary Examiner* — Jagdish Patel
(74) *Attorney, Agent, or Firm* — Foley & Lardner LLP

(57) ABSTRACT

A system, method and program product for managing funds, comprising: databases comprising: aggregated transaction account information for plurality of FDIC-insured and interest-bearing aggregated deposit accounts, and client transaction account information; first computation engine for computing respective excess amount by which a balance of funds from that client transaction account exceeds specified amount; first allocation engine allocating respective excess amounts to one or more aggregated deposit accounts in one or more other financial institutions; second computation engine for determining first amount comprising a sum of a plurality excess amounts to one or more aggregated deposit accounts; second allocation engine for allocating to the one financial institution second amount based on a difference between a sum of funds deposited in the one or more aggregated deposit accounts and sum of current balances from the primary client transaction accounts associated with the one financial institution; update engine, and instruction generator.

15 Claims, 5 Drawing Sheets

U.S. PATENT DOCUMENTS

| | | |
|---|---|---|
| 4,751,640 A | 6/1988 | Lucas et al. |
| 4,774,663 A | 9/1988 | Musmanno et al. |
| 4,953,085 A | 8/1990 | Atkins |
| 4,985,833 A | 1/1991 | Oncken |
| 5,126,936 A | 6/1992 | Champion et al. |
| 5,206,803 A | 4/1993 | Vitagliano et al. |
| 5,220,501 A | 6/1993 | Lawlor et al. |
| 5,235,507 A | 8/1993 | Sackler et al. |
| 5,262,942 A | 11/1993 | Earle |
| 5,270,922 A | 12/1993 | Higgins |
| 5,291,398 A | 3/1994 | Hagan |
| 5,297,032 A | 3/1994 | Trojan et al. |
| 5,424,938 A | 6/1995 | Wagner et al. |
| 5,631,828 A | 5/1997 | Hagan |
| 5,644,727 A | 7/1997 | Atkins |
| 5,671,363 A | 9/1997 | Cristofich et al. |
| 5,689,650 A | 11/1997 | McClelland et al. |
| 5,710,889 A | 1/1998 | Clark et al. |
| 5,765,144 A | 6/1998 | Larche et al. |
| 5,774,880 A | 6/1998 | Ginsberg |
| 5,781,654 A | 7/1998 | Carney |
| 5,802,499 A | 9/1998 | Sampson et al. |
| 5,806,048 A | 9/1998 | Kiron et al. |
| 5,806,049 A | 9/1998 | Petruzzi |
| 5,812,987 A | 9/1998 | Luskin et al. |
| 5,826,243 A | 10/1998 | Musmanno et al. |
| 5,852,811 A | 12/1998 | Atkins |
| 5,864,685 A | 1/1999 | Hagan |
| 5,875,437 A | 2/1999 | Atkins |
| 5,878,258 A | 3/1999 | Pizi et al. |
| 5,878,405 A | 3/1999 | Grant et al. |
| 5,884,285 A | 3/1999 | Atkins |
| 5,890,141 A | 3/1999 | Carney et al. |
| 5,893,078 A | 4/1999 | Paulson |
| 5,903,881 A | 5/1999 | Schrader et al. |
| 5,905,974 A | 5/1999 | Fraser et al. |
| 5,940,809 A | 8/1999 | Musmanno et al. |
| 5,941,996 A | 8/1999 | Smith et al. |
| 5,946,667 A | 8/1999 | Tull et al. |
| 5,950,175 A | 9/1999 | Austin |
| 5,974,390 A | 10/1999 | Ross |
| 5,978,779 A | 11/1999 | Stein et al. |
| 6,014,642 A | 1/2000 | El-Kadi et al. |
| 6,016,482 A | 1/2000 | Molinari et al. |
| 6,026,438 A | 2/2000 | Piazza et al. |
| 6,032,133 A | 2/2000 | Hilt et al. |
| 6,041,314 A | 3/2000 | Davis |
| 6,044,371 A | 3/2000 | Person et al. |
| 6,047,324 A | 4/2000 | Ford et al. |
| 6,049,782 A | 4/2000 | Gottesman et al. |
| 6,052,673 A | 4/2000 | Leon et al. |
| 6,088,685 A | 7/2000 | Kiron et al. |
| 6,092,056 A | 7/2000 | Tull et al. |
| 6,105,005 A | 8/2000 | Fuhrer |
| 6,108,641 A | 8/2000 | Kenna et al. |
| 6,112,191 A | 8/2000 | Burke |
| 6,119,093 A | 9/2000 | Walker et al. |
| 6,131,810 A | 10/2000 | Weiss et al. |
| 6,154,770 A | 11/2000 | Kostakos |
| 6,189,785 B1 | 2/2001 | Lowery |
| 6,192,347 B1 | 2/2001 | Graff |
| 6,226,623 B1 | 5/2001 | Schein et al. |
| 6,317,783 B1 | 11/2001 | Freishtat et al. |
| 6,324,523 B1 | 11/2001 | Killeen et al. |
| 6,363,360 B1 | 3/2002 | Madden |
| 6,374,231 B1 | 4/2002 | Bent et al. |
| 6,513,020 B1 | 1/2003 | Weiss et al. |
| 6,970,843 B1 | 11/2005 | Forte |
| 7,089,202 B1 | 8/2006 | McNamar et al. |
| 7,103,556 B2 | 9/2006 | Del Rey et al. |
| 7,124,101 B1 | 10/2006 | Mikurak |
| 7,133,840 B1 | 11/2006 | Kenna et al. |
| 7,203,845 B2 | 4/2007 | Sokolic et al. |
| 7,206,761 B2 | 4/2007 | Colvin |
| 7,216,100 B2 | 5/2007 | Elliott |
| 7,321,874 B2 | 1/2008 | Dilip et al. |
| 7,321,875 B2 | 1/2008 | Dilip et al. |
| 7,328,179 B2 | 2/2008 | Sheehan et al. |
| 7,376,606 B2 | 5/2008 | Jacobsen |
| 7,383,223 B1 | 6/2008 | Dilip et al. |
| 7,383,227 B2 | 6/2008 | Weinflash et al. |
| 7,392,222 B1 | 6/2008 | Hamilton et al. |
| 7,401,037 B2 | 7/2008 | Arena et al. |
| 7,440,914 B2 | 10/2008 | Jacobsen |
| 7,505,937 B2 | 3/2009 | Dilip et al. |
| 7,509,286 B1 | 3/2009 | Bent et al. |
| 7,519,551 B2 | 4/2009 | Bent et al. |
| 7,529,709 B2 | 5/2009 | Volchek et al. |
| 7,536,340 B2 | 5/2009 | Dheer et al. |
| 7,536,350 B1 | 5/2009 | Bent et al. |
| 7,596,522 B1 | 9/2009 | Jacobsen |
| 7,603,307 B2 | 10/2009 | Jacobsen |
| 7,640,199 B1 | 12/2009 | Hyland |
| 7,657,761 B2 | 2/2010 | Sokolic et al. |
| 7,668,771 B1 | 2/2010 | Bent et al. |
| 7,668,772 B1 | 2/2010 | Bent et al. |
| 7,672,886 B2 | 3/2010 | Bent et al. |
| 7,672,901 B1 | 3/2010 | Bent et al. |
| 7,672,902 B1 | 3/2010 | Bent et al. |
| 7,680,716 B1 | 3/2010 | Bent et al. |
| 7,680,734 B1 | 3/2010 | Bent et al. |
| 7,716,131 B2 | 5/2010 | Bent et al. |
| 7,720,755 B1 | 5/2010 | Coyle |
| 7,729,987 B1 | 6/2010 | Wakim et al. |
| 7,752,107 B1 | 7/2010 | Bent et al. |
| 7,752,129 B2 | 7/2010 | Bent et al. |
| 7,756,767 B2 | 7/2010 | Cluse et al. |
| 7,769,688 B1 | 8/2010 | Bent et al. |
| 7,797,207 B1 | 9/2010 | Dilip et al. |
| 7,809,640 B1 | 10/2010 | Bent et al. |
| 7,814,017 B2 | 10/2010 | Vancini et al. |
| 7,837,100 B2 | 11/2010 | Bonalle et al. |
| 7,860,771 B2 | 12/2010 | Colvin |
| 7,873,571 B1 | 1/2011 | Wehmer |
| 7,873,573 B2 | 1/2011 | Realini |
| 7,873,677 B2 | 1/2011 | Messing et al. |
| 7,886,969 B2 | 2/2011 | Antoo et al. |
| 7,895,098 B2 | 2/2011 | Beard |
| 7,895,099 B2 | 2/2011 | Whiting et al. |
| 7,899,743 B2 | 3/2011 | Jacobsen |
| 7,899,745 B1 | 3/2011 | Jacobsen |
| 7,899,746 B1 | 3/2011 | Jacobsen |
| 7,899,747 B1 | 3/2011 | Jacobsen |
| 7,904,372 B2 | 3/2011 | Whiting et al. |
| 7,917,433 B2 | 3/2011 | Jacobsen |
| 7,921,057 B1 | 4/2011 | Jacobsen |
| 7,933,821 B1 | 4/2011 | Bent et al. |
| 7,945,511 B2 | 5/2011 | O'Brien et al. |
| 7,996,308 B1 | 8/2011 | Bent et al. |
| 8,015,085 B2 | 9/2011 | Blagg et al. |
| 8,019,667 B1 | 9/2011 | Bent et al. |
| 8,019,668 B1 | 9/2011 | Bent et al. |
| 8,032,456 B1 | 10/2011 | Bent et al. |
| 8,036,986 B2 | 10/2011 | Jacobsen |
| 8,051,004 B2 | 11/2011 | Jacobsen |
| 8,051,005 B2 | 11/2011 | Jacobsen |
| 8,086,508 B2 | 12/2011 | Dheer et al. |
| 8,090,651 B2 | 1/2012 | Winslow et al. |
| 2001/0023414 A1 | 9/2001 | Kumar et al. |
| 2001/0032182 A1 | 10/2001 | Kumar et al. |
| 2002/0007330 A1 | 1/2002 | Kumar et al. |
| 2002/0046144 A1 | 4/2002 | Graff |
| 2002/0069147 A1 | 6/2002 | Sheehan et al. |
| 2002/0082981 A1 | 6/2002 | Madden |
| 2002/0087454 A1 | 7/2002 | Calo et al. |
| 2002/0091637 A1 | 7/2002 | Bent |
| 2002/0128951 A1 | 9/2002 | Kiron et al. |
| 2002/0161707 A1 | 10/2002 | Cole et al. |
| 2002/0165757 A1 | 11/2002 | Lisser |
| 2002/0174048 A1 | 11/2002 | Dheer et al. |
| 2002/0178098 A1 | 11/2002 | Beard |
| 2002/0194099 A1 | 12/2002 | Weiss |
| 2003/0023529 A1 | 1/2003 | Jacobsen |
| 2003/0041003 A1 | 2/2003 | Kayser, III |
| 2003/0080185 A1 | 5/2003 | Werther |
| 2003/0135437 A1 | 7/2003 | Jacobsen |
| 2003/0149646 A1 | 8/2003 | Chen et al. |

| | | | |
|---|---|---|---|
| 2003/0163403 | A1 | 8/2003 | Chen et al. |
| 2003/0177092 | A1 | 9/2003 | Paglin |
| 2003/0191702 | A1 | 10/2003 | Hurley |
| 2003/0200174 | A1 | 10/2003 | Star |
| 2003/0208438 | A1 | 11/2003 | Rothman |
| 2003/0236728 | A1 | 12/2003 | Sunderji et al. |
| 2004/0039674 | A1 | 2/2004 | Coloma |
| 2004/0107157 | A1 | 6/2004 | Bleunven et al. |
| 2004/0111361 | A1 | 6/2004 | Griffiths et al. |
| 2004/0128229 | A1 | 7/2004 | Raines et al. |
| 2004/0128235 | A1 | 7/2004 | Kemper et al. |
| 2004/0138974 | A1 | 7/2004 | Shimamura et al. |
| 2004/0153398 | A1 | 8/2004 | Baumgartner et al. |
| 2004/0162773 | A1 | 8/2004 | Del Rey et al. |
| 2004/0177036 | A1 | 9/2004 | Nutahara et al. |
| 2004/0249741 | A1 | 12/2004 | Understein |
| 2005/0044038 | A1 | 2/2005 | Whiting et al. |
| 2005/0091137 | A1 | 4/2005 | Woeber |
| 2005/0102225 | A1 | 5/2005 | Oppenheimer et al. |
| 2005/0102226 | A1 | 5/2005 | Oppenheimer et al. |
| 2005/0108120 | A1 | 5/2005 | Malka et al. |
| 2005/0108149 | A1 | 5/2005 | Bent et al. |
| 2005/0114246 | A1 | 5/2005 | Coloma |
| 2005/0154662 | A1 | 7/2005 | Langenwalter |
| 2005/0228733 | A1 | 10/2005 | Bent et al. |
| 2006/0047593 | A1 | 3/2006 | Naratil et al. |
| 2006/0106703 | A1 | 5/2006 | Del Rey et al. |
| 2006/0155644 | A1 | 7/2006 | Reid et al. |
| 2006/0167773 | A1 | 7/2006 | Yang et al. |
| 2006/0212389 | A2 | 9/2006 | Bent et al. |
| 2006/0213980 | A1 | 9/2006 | Geller et al. |
| 2006/0273152 | A1 | 12/2006 | Fields |
| 2007/0043666 | A1 | 2/2007 | Burdette |
| 2007/0118449 | A1 | 5/2007 | De La Motte |
| 2007/0130065 | A1 | 6/2007 | Staab et al. |
| 2007/0143196 | A1 | 6/2007 | Colvin |
| 2007/0255655 | A1 | 11/2007 | Kemper et al. |
| 2007/0271174 | A2 | 11/2007 | Bent et al. |
| 2007/0276752 | A1 | 11/2007 | Whiting et al. |
| 2007/0288400 | A1 | 12/2007 | Menon |
| 2008/0015985 | A1 | 1/2008 | Abhari et al. |
| 2008/0046358 | A1 | 2/2008 | Holm-Blagg et al. |
| 2008/0065532 | A1 | 3/2008 | De La Motte |
| 2008/0097899 | A1 | 4/2008 | Jackson et al. |
| 2008/0120228 | A1 | 5/2008 | Bent et al. |
| 2008/0133280 | A1 | 6/2008 | Ziegler |
| 2008/0133396 | A1 | 6/2008 | De La Motte |
| 2008/0222053 | A1 | 9/2008 | Jacobsen |
| 2008/0288398 | A1 | 11/2008 | Maricondi |
| 2009/0006985 | A1 | 1/2009 | Fong et al. |
| 2009/0012899 | A1 | 1/2009 | Friesen |
| 2009/0138412 | A1 | 5/2009 | Jacobsen |
| 2009/0327154 | A1 | 12/2009 | Van Vooren et al. |
| 2011/0208640 | A1 | 8/2011 | Geoghegan et al. |
| 2011/0246359 | A1 | 10/2011 | O'Brien et al. |

FOREIGN PATENT DOCUMENTS

| | | |
|---|---|---|
| WO | WO-95/23379 | 8/1995 |
| WO | WO-99/18529 | 4/1999 |
| WO | WO-02/42952 | 5/2002 |
| WO | WO-03/012580 | 2/2003 |
| WO | WO-2005/006111 | 1/2005 |

OTHER PUBLICATIONS

Exhibit 2, Invalidity Chart: U.S. Pat. No. 4,985,833 (Oncken)—U.S. Pat. 7,668,771, Jul. 2010, 14 pages.
Exhibit 5, Invalidity Chart: Merrill Lynch Business Advantage Program—U.S. Pat. No. 7,668,772, Jul. 2010, 7 pages.
Exhibit 8, Invalidity Chart: Harken Financial Services Sweep Product—U.S. Pat. No. 7,668,771, Jul. 2010, 9 pages.
Exhibit 9, Invalidity Chart: Wayne Hummer—Insured Bank Deposit Program—U.S. Pat. No. 7,668,771, Jul. 2010, 12 pages.
Exhibit 10, Invalidity Chart: U.S. Patent Application Publication No. 2007/0043666 (Burdette), U.S. Pat. No. 7,668,771, Jul. 2010, 9 pages.
2 CDs (1) Non-Confidential Exhibits and Material regarding Deutsch Bank Trust Company Americas' (DBTCA) $2^{nd}$ Supp Res to Double Rock's Interrogatory No. 2; (2) Prior Art for IC Non-Confidential Material—Bates-numbered documents for Exhibits 2, 5, 8, 9, and 10 Invalidity Charts, Jul. 2010.
Letter to R.M. Zaitzeff, from W.W. Wiles, dated Jun. 22, 1983 (response to May 10, 1983 letter re: offering of MMDAs), 6 pages.
Letter to G.T. Schwartz, from O.I. Ireland, dated Jun. 22, 1988 (response to Dec. 18, 1987 letter re: proposed modifications to Merrill Lynch's CMA Program), 5 pages.
Information Statement, "Alliance Insured Account," Sep. 1999; 6 pages.
Investors MoneyAccount$^{SM}$ and Insurance Plus Service Agreement, attached Schedule A (List of Banks Participating in the Insurance Plus Service), IMAD Mar. 1994, 3 pages.
Investors Money Account$^{SM}$ (an FDIC-insured money market account), IMA-1 (Mar. 1994), 4 pages.
Investors MoneyAccount$^{SM}$, "The FDIC-Insured Money Market Investment with an Important Plus," IMA Sep. 1995, 2 pages.
1985 SEC No-Act. LEXIS 2756, Investment Company Act of 1940—Section 3(a)(1), 2(a)(36); Securities Act of 1933—Section 2(1), Nov. 29, 1985, Kemper Financial Services, Inc., 9 pages.
Insured Money Account Program Agreement and Disclosure Statement, (attached Schedule A—Deposit Account Terms), faxed Mar. 28, 2000; 10 pages.
First National Bank in Brookings, Certificates of Deposit [online] [retrieved on Jul. 17, 2009]. Retrieved from the Internet: Certificates of Deposit, <URL: http://web.archive.org/web/20000524121111/www.firstnb.com/cd.htm>; Multi-Bank CDs, <URL: http://web.archive.org/web/20000524132934/www.firstnb.com/mbcd.htm>, 5 pages.
Summary of Commentary on Current Economic Conditions by Federal Reserve Districts, Jan. 1985, 44 pages.
12 CFR Ch. II (Jan. 1, 2009 Edition), pp. 124-125.
Product Strategy, "Money Fund $$ Moving to Bank Deposits, Distributors Start to Install Bank Deposit Accounts to Replace Money Funds," 6 FRC Monitor, Dec. 2003, 2 pages.
Board of Governors of the Federal Reserve System, "The May 1998 Senior Financial Officer Survey," May 1998, (attached Appendix A: Survey Questions and Responses; Appendix B: Glossary; Appendix C: Examples of Key Reserve Concepts), 48 pages.
Interest Rate Review, A Publication of the Meyer Weekly Interest Rate Survey, "A Look at Tiers," Apr. 1987, 6 pages, vol. 11, No. 4.
LexisNexis, The American Banker, "Merrill Joins Money Market Account, CMA; Broker Begins Testing With 12 Institutions," Sep. 23, 1983, 4 pages.
Bent et al., Office Action, U.S. Appl. No. 10/071,053, with attached SB08, date considered Mar. 12, 2009, 2 pages.
Merrill Lynch & You, "Financial Services The Way You Want, When You Want Them," Jan. 2000, 16 pages.
Exhibit 1, "FA/FB Account 1997 First Transactions, TRX Types: PU, PP, TA, PT," Aug. 2003, p. 1-2.
Advertisement: Where Your Interest is?, Mutual Funds, Oct. 1997; 1 page.
Advertisement: It's 1997, Do You Know Where Your Interest Is?, Mutual Funds, Dec. 1993, p. 46.
USPTO Office Action, Interview Summary, U.S. Appl. No. 11/767,827, Date Mailed Sep. 23, 2009, 4 pages.
UPTO Office Action, Office Action Summary, U.S. Appl. No. 11/767,827, Date Mailed Jun. 5, 2009, 35 pages.
Service Mark Application, Applicant: Reserve Management Corporation, Mark: Reserve Insured Deposits, (attached Power of Attorney, Declaration, Drawing Page, Sep. 21, 2001, 6 pages.
Letter to R.L. Kratzer, from T.J. Vezeau, Re: United States Patent No. 6,374,231, dated Jan. 10, 2003, 1 page.
Letter to C.R. Macedo, from R.L. Rainey, Re: Promontory Interfinancial Network, LLC, dated Jul. 22, 2008, (attached Attachments A-E), 35 pages.
Letter to C.R. Macedo, from R.L. Rainey, Re: Promontory Interfinancial Network, LLC, dated Oct. 16, 2008, (attached Attachments A-C), 22 pages.
Letter to C.R. Macedo, from R.L. Rainey, Re: Promontory Interfinancial Network, LLC, dated Feb. 23, 2009, (attached Exhibit A-B), 21 pages.

Letter to R.L. Kratzer, from T.J. Vezeau, Re: United States Patent No. 6,374,231, dated Jan. 10, 2003 (with various attachments), 128 pages.
Letter to A.J. Bufalino, from C.R. Macedo, Re: Reserve Management Corporation, Wayne Hummer Investments LLC, May 8, 2007, (enclosing Jan. 3, 2006 letter to A.J. Bufalino, Feb. 23, 2006 letter to A.J. Bufalino, Mar. 16, 2006 letter to C. Macedo, U.S. Patent No. 6,374,231, U.S. Publication No. 2002/0091637 A1, U.S. Publication No. 2005/0108149 A1, U.S. Publication No. 2005/0228733 A1, U.S. Publication No. 2006/0212385 A2, U.S. Publication No. 2006/0212389 A2), 510 pages.
Merrill Lynch & Co., Inc., Form 10-K405 (Annual Report (Regulation S-K, item 405)), Filed Mar. 14, 2002 for the Period Ending Dec. 28, 2001, 248 pages.
Merrill Lynch, "Information Statement Regarding changes to Interest Rates on Deposits in the Merrill Lynch Banks," Nov. 12, 2007, 2 pages.
QUESTessentials, "Quest Insured Account," May 17, 1994, 3 pages.
Information Statement, "Quest Insured Account," (attached Appendix A), 5 pages.
OCC Insured Bank Deposit Account (attached are p. 2 of Quest for Value Funds Daily Data, Jun. 1993; OCC Insured Account Rate Table), 3 pages.
CIBC World Markets, "Insured Bank Deposit Account," Information Statement, Jul. 1, 2000, 2 pages.
Letter to Client, from M.J. Hensle, Re: Salomon Smith Barney Bank Deposit Program$^{SM}$, (attached Q&A: Important Information about the New Salomon Smith Barney Bank Deposit Program), Aug. 16, 2020, 14 pages.
Salomon Smith Barney, "Bank Deposit Program Disclosure Statement," 3 pages.
FDIC, FDIC Law, Regulations, Related Acts—4000—Advisory Opinions, Oct. 22, 1987, J.W. Via, Jr., Counsel [online] [Retrieved on Jan. 22, 2010]. Retrieved from the Internet: URL: <http://www.fdic.gov/regulations/laws/rules/4000-2560.html>, 1 page.
FDIC, FDIC Law, Regulations, Related Acts—4000—Advisory Opinions, Jun. 28, 1993, J. A. DiNuzzo, [online] [Retrieved on Jan. 22, 2010]. Retrieved from the Internet: URL: <www.fdic.gov/regulations/laws/rules/4000-8240.html>, 2 pages.
FDIC, FDIC Law, Regulations, Related Acts—4000—Advisory Opinions, Jul. 23, 1986, D. H. Jones [online] [Retrieved on Jan. 22, 2010]. Retrieved from the Internet: URL: <www.fdic.gov/regulations/laws/rules/4000-2120.html#fdic400086-21>, 2 pages.
Merrill Lynch—Pierce, Fenner & Smith, Inc., "The Merrill Lynch Cash Management Account®," Financial Service, Jan. 1985, 18 pages.
Merrill Lynch, "Insured Savings™ Account Fact Sheet," The Merrill Lynch Cash Management Account® Financial Service, 11 pages.
CMA, "A Guide to Your CMA Account," Jan. 1995, 38 pages.
American Banker, Salomon's Sweep Plan Raises FDIC Fund Alarm [online], Dec. 6, 2000 [retrieved on Apr. 13, 2009]. Retrieved form the Internet: <URL: http://www.americanbanker.com/printthis.html?id=2000120603YJGEZD>, 2 pages.
The Insured Deposit Account: "Money in the Bank," p. 5; Three Little Letters. Three Big Ways to Save in 1998, p. 4.
LexisNexis, The American Banker, Sep. 23, 1983, Merrill Joins Money Market Account, CMA; Broker Begins Testing With 12 Institutions, Byline: A. Arvan, 4 pages.
Merrill Lynch & Co Inc—MER, 10k WIZARD, Form 8-K, "Report of Unscheduled Material Events or Corporate Changes," Filed Mar. 7, 2002, 51 pages.
Federal Reserve System, LEXSEE 51 FR 9632, "Definition of Deposit and Technical Amendments," Action: Final Rule, Mar. 20, 1986, 13 pages.
Federal Reserve System, LEXSEE 56 FR 15494, "Regulation D—Reserve Requirements of Depository Institutions," Action: Final Rule, Apr. 17, 1991, 5 pages.
Federal Reserve System, Part 201—Reserve Requirements of Depository Institutions (Regulation D)12 CFR Ch. II (Jan. 1, 2010 Edition), pp. 94-128, Pt. 204-Pt. 205.
Letter to G.T. Schwartz, from O.I. Ireland, dated Jun. 22, 1988, Re: response to letter of Dec. 18, 1987 regarding proposed modifications to Merrill Lynch's CMA Program, 5 pages.

Federal Reserve System, LEXSEE 47 FR 55207, "Reserve Requirements of Depository Institutions; Money Market Deposit Account," Dec. 8, 1982, Action: Final Rule, 5 pages.
Insured Bank Deposits™ Program Summary Information Statement, 11 pages.
Insured Bank Deposits™ Program Information Statement, (attached List of Eligible Program Banks, Effective May 9, 2002; New Account Application, Joint Account Agreement), 11 pages.
Wayne Hummer Investments, "Insured Bank Deposits™ Program, Frequently Asked Questions," 4 pages.
American Express—Meeting Notes Sep. 26, 2000, 2 pages.
American Express Conference Call Minutes, Jan. 25, 2001 @ 3:00pm-4:00pm, Topic: Tiered Balances, 2 pages.
Memorandum to M. Peterson, J. Whitt, R. Wroten, E. Naumes, E. Deal, B. McCain, from J.E. Oncken, Jun. 15, 1990, Re: Insured Savings Update (with attachments), 7 pages.
Insured Savings, "Correspondent Agreement," including Exhibits A-D, 28 pages.
Insured Savings, "Project Team Meeting," Feb. 2, 1989, 21 pages.
Insured Savings, "Overview & Marketing Plan," Presented by: J.E. Oncken, Dec. 6, 1988, (including Exhibit A), 23 pages.
Letter to V.J. Best, from J.E. Oncken, dated Apr. 18, 1988, 2 pages.
Letter to M.L. Duke from K. Johnson, dated Dec. 27, 1989, (attached Insured Savings Correspondent Agreement, Exhibits A-D, letter to M.L. Duke from K. Johnson dated Nov. 21, 1989 and Account Information Sheet), 39 pages.
Memorandum to J. Oncken, J. Scurlock, B. Standefer, E. Piner, T. Cyr, from K. Johnson, dated Jul. 5, 1990, Re: Attached Insured Savings Letters (with attachments), 9 pages.
E.D.S.—First City Austin Electronic Mail, from J. Oncken, to T. Cyr, Re: Depository Levels at Insured Savings Depositories, Nov. 2, 1989, 1 page.
Cash Management Balance Monitoring Agreement and Memorandum from Ed Piner to Cash management Line of Business Representatives dated May 21, 1991(with attachments), 8 pages.
Merrill Lynch, Insured Savings Account Fact Sheet, The Merrill Lynch Cash Management Account® Financial Service, Jan. 1986, 4 pages.
Merrill Lynch Money Markets, Inc., Merrill Lynch Capital Markets, "The Insured Savings Account, Issuer Guide to Offering MMDAs through Merrill Lynch," Sep. 1986; 36 pages.
Merrill Lynch, The Merrill Lynch Capital Builder$^{SM}$ Account Financial Service, Insured Savings$^{SM}$ Account Participating Depository Institutions, 1996, 2 pages.
Insured Deposit Account, May 21, 1996, 14 pages.
An Introduction to the Smith Barney Insured Deposit Account, 8 pages.
Smith Barney Inc. Capital Markets, Debt Origination Group Memo, to J. Mandelbaum, from T. Hamilton, cc: R. Holloman, H. Bald, S. Becton, Re: Insured Deposit Account, Oct. 10, 1995; Smith Barney Inc. Capital Markets, Debt Origination Group Memo, to B. Holloman, from T. Hamilton, cc: W. Heinzerling, H. Morris, COPs, Re: New Product Proposal for Insured Deposit Account, Sep. 18, 1995, 2 pages.
Insured Deposit Account, Product Description for the Investor, Draft as of Sep. 20, 1995, 8 pages.
Memorandum from Ken Johnson re: Insured Deposit Products, Aug. 18, 1992, 3 pgs.
Memorandum from John E. Oncken re: Insured Savings Update, Jun. 15, 1990, 7 pgs.
Memorandum from John E. Oncken re: Brokered Deposit Issue vs. Insured Savings, Mar. 22, 1990, 8 pgs.
Memorandum from Ed Piner re: Insured Savings Product Update, Feb. 1, 1990, 4 pgs.
Insured Savings Correspondent Agreement with Exhibits A-D, 28 pgs.
First City, Texas Insured Savings Agency Agreement with Exhibits A-B and Insured Savings Program, 10 pgs.
Product Bulletin from Bill McCain, Subject: Insured Savings Product Announcement, May 8, 1989, 7 pgs.
Insured Savings Project Team Meeting, Feb. 2, 1989, 16 pgs.
Insured Savings Product Description, Product Name: Insured Savings, Product Description: U.S. Patent #4,985,833, 3 pgs.

Letter to Tim C. Lear, Sep. 20, 1988, 1 pg., with Memorandum from Ed Piner, re: Insured Savings Product, Nov. 9, 1988, and Letter from Tara L. Cyr, Dec. 9, 1988, 1 pg.
Automatic Insured Deposit Method, Patent Application Information, Jul. 11, 1988, 17 pgs.
Insured Savings, Overview & Marketing Plan, Dec. 6, 1988, 23 pgs.
Memorandum from Dick Zinser, re: A First City—Austin deposit program to hold existing customers' deposits, Mar. 17, 1988, 7 pgs.
Insured Savings Remote Site Sweep Procedures, 3 pgs.
Letter to Malcolm L. Duke, Dec. 27, 1989 with Insured Savings Correspondent Agreement, Exhibits A-D, and Letter to Malcolm L. Drake, Nov. 21, 1989, 37 pgs.
Memorandum from Ken Johnson, re: Attached Insured Savings Letters, Jul. 5, 1990, 1 pg.
Letter to Jerry Crutsinger, Jul. 3, 1990, 1 pg.
Letter to Bill Goertz, Jul. 3, 1990, 1 pg.
Letter to Susan Goodwin, Jul. 3, 1990, 1 pg.
Insured Savings Rate Change Notice, 1 pg.
Addendum to Insured Savings Agency Agreement, 1 pg.
Letter to Paula Martin, Jul. 3, 1990, 1 pg.
Letter to John Lovell, Jul. 3, 1990, 1 pg.
Insured Savings Balance Limits form, 1 sheet.
Email from John Oncken re: Depository Levels at Insured Savings Depositories, Nov. 2, 1989, 1 pg.
Cash Management Balance Monitoring Agreement Form 1 sheet.
Memorandum from Ed Piner, Subject: Discontinuation of Automatic Balance Monitoring in conjunction with Insured Savings Accounts, May 21, 1991, 1 pg.
Blank form letter from Edward N. Piner, May 24, 1991, 1 pg.
Letter from First City National Bank of Austin, Sep. 20, 1982, 5 pgs.
First City, Texas—Austin, Special Products, Feb. 20, 1992, with Schedule A & Schedule B, 6 pgs.
Letter From William W. Wiles, Secretary of the Board, Board of Governors of the Federal Reserve System, Jun. 22, 1983, 6 Sheets. (Previously disclosed).
Letter From Oliver I. Ireland, Associate General Counsel, Board of Governors of the Federal Reserve System, Jun. 22, 1988, 5 Sheets. (Previously disclosed).
Alliance Insured Account, Information Statement, Sep. 1999, 6 sheets.
Lawsuit by Carlo DeBlasio et al. and Merrill Lynch & Co., Inc. et al., Opinion and Order, Jul. 27, 2009, Civil Action No. 07 CIV. 318, 47 pgs.
Lawsuit by Carlo DeBlasio et al. and Merrill Lynch & Co., Inc. et al., Second Amended Class Action Complaint, Jury Trial Demanded, Jun. 11, 2007, Civil Action No. 07 cv 318, 137 pgs.
Investors MoneyAccount$^{SM}$ and Insurance Plus Service Agreement, Schedule A, 3 sheets.
Investors MoneyAccount$^{SM}$ (an FDIC-insured money market account), 4 sheets.
Investors MoneyAccount$^{SM}$ The FDIC-Insured Money Market with an Important Plus., 2 sheets.
Investment Company Act of 1940—Section 3(a)(1), 2(a)(36); Securities Act of 1933—Section 2(1), Nov. 29, 1985, Kempter Financial Services, Inc., 9 pgs.
Insured Money Account Program Agreement and Disclosure Statement, 11 sheets.
First National Bank in Brookings, Certificates of Deposit, 5 sheets.
Summary of Commentary on Current Economic Conditions by Federal Reserve Districts, Jan. 1985, 44 pgs.
Board of Governors of the Federal Reserve System, Blank Form Letter, Apr. 22, 2004, 8 pgs.
FDIC Law, Regulations, Related Acts, 4000—Advisory Opinions, FDIC-93-35, Jun. 28, 1993, 2 sheets.
§204.134, 12 CFR Ch. 11 (Jan. 1, 2009), 2 sheets.
Money Fund $$ Moving to Bank Deposits, 6 FRC Monitor, Dec. 2003, 2 sheets.
Crane, P. & Krasner, Mike, An iMoney Net Special Report™, "Brokerage Cash Sweep Options: The Shift from Money Funds to FDIC-Insured Bank Deposit Accounts", Nov. 2004, 64 pgs.
The May 1998 Senior Financial Officer Survey, Board of Govenors of the Federal Reserve System, with Appendix A, 48 pgs.

Interest Rate Review © A Publication of Meyer Weekly Interest Rate Survey, A Look At Tiers, vol. II, No. 4, Apr. 1987, 6 pgs.
Interest Rate Review © A Publication of Meyer Weekly Interest Rate Survey, A Study of Historical Rates and Yields, vol. II, No. 6, Jun. 1987, 8 pgs.
Blank form letter to Oliver Ireland, Oct. 7, 1994, 1 pg.
Letter to L.P. Fleming, Jr. Esq., Feb. 7, 1995, 3 pgs.
Letter to James E. Creekman, Aug. 1, 1995, 4 pgs.
Letter to Brenda L. Skidmore, Aug. 30, 1995, 4 pgs.
Merrill Lynch & Co., Inc. Form 10-K405 (Annual Report (Regulation S-K, item 405)), Filed Mar. 14, 2002 for the Period Ending Dec. 28, 2001, with Schedules, Exhibits, and 2001 Annual Report, 248 pgs.
Merrill Lynch & You, "Financial Services The Way You Want, When You Want Them," Jan. 2000 4 Sheets. (Previously disclosed).
Merrill Lynch, Pierce, Fenner & Smith Incorporated, "Information Statement," 2000, 12 Sheets. (Previously disclosed).
Merrill Lynch, Information Statement Regarding Changes to Interest Rates on Deposits in the Merrill Lynch Banks, Document 64-14, Nov. 12, 2007, Case 1:07-cv-00318, 2 sheets.
Street Talk, "Merrill Moves CMA Cash to Bank", On Wall Street, Nov. 2000, 1 sheet.
Quest Insured Account, QUESTessentials, 3 sheets.
Quest Insured Account, Information Statement, 5 sheets.
OCC Insured Bank Deposit Account, 3 sheets.
Insured Bank Deposit Account, Information Statement, Jul. 1, 2000, 2 sheets.
Letter from Marilyn J. Hensle, announcing Salomon Smith Barney Bank Deposit Program.$^{SM}$, with Q&A, 14 sheets.
Bank Deposit program Disclosure Statement, Salomon Smith Barney, 3 sheets.
FDIC Law, Regulations, Related Acts, 4000—Advisory Opinions, FDIC-87-25, Oct. 22, 1987, 1 sheet.
FDIC Law, Regulations, Related Acts, 4000—Advisory Opinions, FDIC-86-21, Jul. 23, 1986, 2 sheets.
The Merrill Lynch Cash Management Account, Financial Service, 18 pgs.
The Insured Savings Account, Issuer Guide to Offering MMDAs through Merrill Lynch, 27 pgs.
Insured Savings Account Fact Sheet, The Merrill Lynch Cash Management Account Financial Service, 1987, 11 pgs.
CMA Insured Savings Account Fact Sheet, 1994, 9 pgs.
A Guide to Your CMA Account, 1995, 19 pgs.
Insured Savings Account Fact Sheet, The Merrill Lynch Cash Management Account Financial Service, 1985, 4 pgs.
CMA Insured Savings Account Fact Sheet, 1997, 13 pgs.
Blackwell, Rob, Salomon's Sweep Plan Raises FDIC Fund Alarm, American Banker, Dec. 6, 2000, 2 pgs.
Insured Deposit Account (IDA), May 21, 1996, 11 pgs.
An Introduction to the Smith Barney Insured Deposit Account, 1995, 8 pgs.
Memorandum from Ted Hamilton re: Insured Deposit Account, Oct. 10, 1995, 13 pgs.
The Insured Deposit Account: "Money in the Bank", 1997, 2 sheets.
Merrill Joins Money Market Account, CMA; Broker Begins Testing With 12 Institutions, Lexis Nexis, Sep. 23, 1983, 4 pgs.
Form 8-K Merrill Lynch & Co Inc—MER, Filed: Mar. 7, 2002, Report of unscheduled material events or corporate changes, 41 pgs.
Lawsuit by Island Intellectual Property LLC and Intrasweep LLC against Deutsche Bank Trust Company Americas and Total Bank Solutions, Complaint for Patent Infringement, Jury Trial Demanded, Feb. 23, 2010, Case No. 10 CV 1518, (Document 1).
Lawsuit by Island Intellectual Property LLC and Lids Capital LLC against Deutsche Bank Trust Company Americas and Total Bank Solutions, Complaint for Patent Infringement, Jury Trial Demanded, Mar. 16, 2010, Case No. 10 CV 2268.
Quest Cash Management Services Memorandum to Tom Duggan, Re: Quest Insure Account, Nov. 16, 1993.
Lawsuit by Island Intellectual Property LLC, Lids Capital LLC, Double Rock Corporation, and Intrasweep LLC against Deutsche Bank Trust Company Americas, and Total Bank Solutions, LLC, Defendants' Preliminary Invalidity Contentions, Mar. 12, 2010, Civil Action No. 09 Civ. 2675 (VM) (AJP).

Lawsuit by Island Intellectual Property LLC and Intrasweep LLC against Institutional Deposits Corp., Defendant Institutional Deposits Corp.'s Preliminary Invalidity Contentions, Case No. 09-CV-03079-JEC.
Exhibit 1, Invalidity Chart: IMA and Insurance Plus Service Agreement, U.S. Patent No. 7,509,286, 21 pgs.
Exhibit 2, Invalidity Chart: Investors Money Account$^{SM}$ System, U.S. Patent No. 7,509,286, 26 pgs.
Exhibit 3, Invalidity Chart: Insured Money Account System, U.S. Patent No. 7,509,286, 26 pgs.
Exhibit 4, Invalidity Chart: U.S. Patent No. 4,985,833 (Oncken), U.S. Patent 7,509,286, 21 pgs.
Exhibit 5, Invalidity Chart: First City Bank of Texas' Insured Savings Program, U.S. Patent No. 7,509,286, 39 pgs.
Exhibit 6, Invalidity Chart: Quest Insured Account, U.S. Patent No. 7,509,286, 19 pgs.
Exhibit 7, Invalidity Chart: CIBC World Markets—Insured Bank Deposit Account, U.S. Patent No. 7,509,286, 16 pgs.
Exhibit 8, Invalidity Chart: Merrill Lynch CMA/ISA Service, U.S. Patent No. 7,509,286, 72 pgs.
Exhibit 9, Invalidity Chart: 1983 Fed Letter, U.S. Patent No. 7,509,286, 16 pgs.
Exhibit 10, Invalidity Chart: Merrill Lynch Banking Advantage Program ("MLBA Program"), U.S. Patent No. 7,509,286, 22 pgs.
Exhibit 11, Invalidity Chart: Merrill Lynch & You + MLBA Information Statement, U.S. Patent No. 7,509,286, 18 pgs.
Exhibit 12, Invalidity Chart: Smith Barney Insured Deposit Account, U.S. Patent No. 7,509,286, 22 pgs.
Exhibit 13, Invalidity Chart: Smith Barney Bank Deposit Program, U.S. Patent No. 7,509,286, 18 pgs.
Exhibit 14, Invalidity Chart: Alliance Insured Account, U.S. Patent No. 7,509,286, 16 pgs.
Exhibit 15, Invalidity Chart: Reserve's American Express Presentation, U.S. Patent No. 7,509,286, 16 pgs.
Exhibit 16, Invalidity Chart: U.S. Patent No. 7,376,606 (Jacobsen), U.S. Patent No. 7,536,350, 6 pgs.
Exhibit 17, Obviousness Combinations Chart, U.S. Patent No. 7,509,286, 351 pgs.
Dreyfus Insured Deposit Program Disclosure Statement and Terms and Conditions, 12 pages.
Lawsuit by Island Intellectual Property LLC against Clearview Correspondent Services, LLC, et al.; Complaint for Patent Infringement; Civil Action No. 1:11-cv-448 (LO/TRJ); Apr. 26, 2011; 55 pages.
Lawsuit by Island Intellectual Property LLC against First Southwest Company; Complaint for Patent Infringement; Civil Action No. 1:11-cv-00371-UNA; Apr. 26, 2011; 42 pages.
U.S. Appl. No. 12/025,402, filed Feb. 4, 2008, Bent.
Lawsuit by Island Intellectual Property LLC et al., against Deutsche Bank Trust Company Americas, et al.; Expert Report of Richard T. Powers Concerning Invalidity of U.S. Pat. Nos. 7,509,286; 7,519,551; 7,536,350; 7,668,771; 7,668,772; 7,672,886; and 7,680,734; and Exhibits A-R; Civil Action No. 09 Civ. 2675(VM)(AJP), Oct. 28, 2010; 1,119 pages.
Lawsuit by Island Intellectual Property LLC, et al. against Deutsche Bank Trust Company Americas, et al.; Expert Report of Ivan Zatkovich Regarding Validity and Enforceability of the Asserted Claims of the Patents-in-Suit; Civil Action No. 09 Civ. 2675 (VM)(AJP); Nov. 23, 2010; 192 pages. The redacted items were designated as confidential in a Protective Order in this case.
Lawsuit by Island Intellectual Property LLC, et al. against Deutsche Bank Trust Company Americas, et al.; Expert Report of the Honorable Gerald J. Mossinghoff and Exhibits A-E; Civil Action No. 09 Civ. 2675 (VM)(AJP); Nov. 23, 2010; 107 pages.
U.S. Appl. No. 60/307,815, filed Jul. 27, 2001, Jacobsen.
U.S. Appl. No. 60/323,365, filed Sep. 20, 2001, Jacobsen.
U.S. Appl. No. 10/825,440, filed Apr. 14, 2004, Bent et al.
AB 2011 Assembly Bill—Bill Analysis, Senate Amendments, http://www.leginfo.ca.gov/pub/bill/asm/ab_2001-2050/ab_2011_cfa_20060811_161755_asm_floor.html, 2006, pp. 1-3.
AB 2011 Assembly Bill—Bill Analysis, Senate Rules Committee, Third Reading, http://www.leginfo.ca.gov/pub/bill/asm/ab_2001-2050/ab_2011_cfa_20060705_161454_sen_floor.html, 2006, pp. 1-7.

AB 2011 Assembly Bill—Chaptered, http://www.leginfo.ca.gov/pub/bill/asm/ab_2001-2050/ab_2011_bill_20060925_chaptered.html, 2006, pp. 1-3.
AB 2011 Assembly Bill—Enrolled, http://www.leginfo.ca.gov/pub/bill/asm/ab_2001-2050/ab_2011_bill_20060816_enrolled.html, 2006, pp. 1-3.
AB 2011 Assembly Bill—History, Complete Bill History, http://www.leginfo.ca.gov/pub/bill/asm/ab_2001-2050/ab_2011_bill_20060925_history.html, 2006, p. 1.
About iMoneyNet, Inc., About iMoneyNet's Money Funds Division, 4 Sheets, Aug. 21, 2003, http://www.ibcdata.com/about.htm.
Announcing Changes in Automatic "Sweep" Investment Options, LPL Financial Services, Linsco/Private Ledger, Member NASD/SIPC, 26 Sheets.
Anderson et al. "Retail Sweep Programs and Bank Reserves," Federal Reserve Bank of St. Louis Review, Bell & Howell Information and Learning Company, vol. 83, Issue 1, 24 Sheets, Jan. 1, 2001.
Bent, "Bruce Bent Makes Money Market Funds Act Like Bank Accounts," Equity BBDP, Oct. 5, 1998, 3 Sheets.
Blackwell, "ABA to Approve System for Sharing Deposit Coverage," American Banker, 2 Sheets, Feb. 11, 2003.
Blackwell, "New Pitch: Deposit Insurance Sharing," American Banker Online, 4 Sheets, Jan. 21, 2003.
Britt, "Struggling with Sweep Accounts," America's Community Banker, vol. 6, No. 12, 11 Sheets, Dec. 1, 1997.
California Independent Bankers, ICBA Independent Community Bankers of America, Banker Bulletin, 2006, CIB 16th Annual Convention, vol. 4, issue 6, http://www.cib.org/banker_bulletin.htm.
Capital Briefs: Corporate Checking Account Relief Sought, American Banker, vol. 162, Jul. 28, 1997, 1 Sheet.
Certificate of Deposit Registry Service: Keeping Deposits in the Corn Patch, Banknews, 2 Sheets. Mar. 2003.
Chapelle et al. "Peering Into Tomorrow: At the Threshold of a New Century, Brokers and Others Discuss Where They were Going," Securities Data Publishing on Wall Street, 6 Sheets, Dec. 1, 1999.
Chapelle, "Merrill's Rivals Say They, Too. Offer Services Beyond Banking," Securities Data Publishing on Wall Street, 2 Sheets, Feb. 1, 2003.
Coyle, "A Look at commercial Demand Deposit Options," America's Community Banker, vol. 9, Issue 2, Bell & Howell Information and Learning Company, 9 Sheets, Feb. 1, 2000.
Crockett, "Big Banks Found Stepping Up Marketing of 'Sweep' Accounts," American Banker, vol. 159, No. 198, American Banker Inc., 3 Sheets, Oct. 13, 1994.
Declaration of Mr. Bruce Bent II, Vice Chairman and Registrant of Applicant on the date of first commercial use of the service providing interest and FDIC insurance for checking accounts by means of a system using money market deposit accounts (MMDA's) of Oct. 23, 1997.
Declaration of Mr. Bruce Bent II, Vice Chairman and Registrant of Applicant. (3 Sheets) and Exhibits A, B, C and D (6 Sheets).
FDIC Federal Register Citations: Email from Bert Ely to Comments, Mar. 8, 2006, Subject: Large-Bank Deposit Insurance Determination Proposal—RIN 3064-AC98—Regs@fdic.gov. Attached, also from FDIC Federal Register Citations: Email From American Banker, by Bert Ely, Feb. 24, 2006, Viewpoint: FDIC's Account-Link Plan a Pointless, Costly Threat.
Fredrickson, "Rising Rates Rescue Money Fund Firm Reserve Profits by Picking Niches," Crain's New York Business, Crain Communications Inc., vol. 20, Issue 51, 2 Sheets, Dec. 20, 2004.
Heavyweight Funding, Bankers News, Mar. 4, 2003, vol. II, Issue No. 5, 2 Sheets.
Hoffman, "Reserve's FDIC-Insured Account Draws Regionals; But some see little need for insurance," Crain Communications Inc., Investment News, 2 Sheets, Jun. 4, 2001.
Insured Cash Account Program Disclosure Booklet, LPL Financial Services, Linsco/Private Ledger, Member NASD/SIPC.
Keenan, "Tapping Brokerages for Alternative to CDs," American Banker, The Financial Services Daily, 3 Sheets, Feb. 18, 2004.
Lavine, "Check Out High-Yield Checking Accounts," Broward Daily Business Review, vol. 39, No. 102, 2 Sheets, Apr. 27, 1998.

Letter From Jamey Basham, Attorney, LEXSEE 1990 FDIC Interp. Ltr., Lexis 1, Federal Deposit Insurance Corporation, FDIC-90-02, Jan. 3, 1990, 2 Sheets.
Letter From Colleen Curran Harvey, Deputy Chief Counsel, Jan. 8, 1985; Letter From Merle Y. Waldman, Nov. 14, 1984; Letter From Merle Y. Waldman, Sep. 24, 1984; Letter From Merle Y. Waldman, Aug. 8, 1984, LEXSEE 1985 Sec No- Act., Lexis 1593, Securities Exchange Act of 1934—Section 15(a), 11 Sheets.
Letter to Mr. Jonathan L. Levin, Esq., From Oliver Ireland, Associate General Counsel, Oct. 18, 1996, 2 Sheets.
Letter to Mr. L.P. Fleming, Jr., Esq., From Oliver Ireland, Associate General Counsel, Feb. 7, 1995, 3 Sheets.
Letter to Mr. James E. Creekman, Group Vice President, From Oliver Ireland, Associate General Counsel, Aug. 1, 1995, 4 Sheets.
Letter to Ms. Brenda L. Skidmore, Senior Vice President, From Oliver Ireland, Associate General Counsel, Aug. 30, 1995, 4 Sheets.
Liberman et al., Market Watch, "How Important are Banks?" FDIC Insurance on Deposits Just One Continuing Advantage, Oct. 17, 2006, 3 Sheets.
McReynolds et al. "Unusual Products for Unusual Times," Securities Data Publishing on Wall Street, 6 Sheets, May 1, 2001.
McReynolds, "The Power of Cash: Ho-hum cash can be great product (and lead to more business) in troubled times," Securities Data Publishing on Wall Street, 3 Sheets, Jun. 1, 2002.
Money Fund Report, IBC Financial Data, Inc., Nov. 6, 1998, 1 Sheet.
Mutual Funds Magazine, Bargain Basement Funds, Oct. 1997, 1 Sheet.
Mutual Funds Magazine, Bargain Basement Funds, Oct. 1997, 2 Sheets.
News Article: "Regulators Support Demand Deposit Bill", Regulatory Compliance Watch—Mar. 9, 1998; 2 Sheets, vol. 9, No. 10.
Part: 2, Monetary Policy and Reserve Requirements, Subpart— Regulation D, Board Interpretations of Regulation D, Transaction Accounts—Linked to Time Deposits, vol. 1, Federal Reserve Regulatory Service, 2 Sheets.
Potter, "As Sweep Accounts Continue to Grow, So do Community Bank Options," America's Community Banker, vol. 9, Issue 8, Bell & Howell Information and Learning Company, 3 Sheets, Aug. 1, 2000.
Promontory Interfinancial Network: http://www.promnetwork.com/index.html, 2003.
Reserve Insured Deposits, United States Patent and Trademark Office, Reg. No. 2,694,910, Registered Mar. 11, 2003, 1 Sheet.
Reserve Management Corporation, Reserve Insured Deposits, U.S. Appl. No. 76/315,600, Issued.
Share, "New Service Skirts FDIC's $100K Limit," Dialog Web Command Mode, 2 Sheets, Jun. 13, 2003, http://www.dialogweb.com/cgi/dwclient.
Smith, "IBAA Won't Push Interest-Bearing Checking for Business; Says Too Few Members Want It," The American Banker, 2 Sheets, Apr. 18, 1996.
Stafford, "New Bank Program Allows $1 Million in Insured Deposits," Dialog Web Command Mode, 3 Sheets, Aug. 24, 2003, http://www.dialogweb.com/cgi/dwclient.
The Insured Savings Account, Issuer Guide to Offering MMDAs Through Merrill Lynch, Merrill Lynch Money Markets, Inc., "Operational Guide to the Merrill Lynch MMDA Program 1986", Sep. 1986 3 Sheets.
The Reserve Fund, Study of U.S. Patent No. 6,374,231, 1 Sheet.
The Reserve Funds Press Release, "The Reserve Funds and Frontier Bank Partner to Offer Revolutionary Banking Product," 5 Sheets, Aug. 1, 2000.
The Reserve, "Company History," 3 Sheets, Oct. 4, 2006, http://www.ther.com/aboutus/history.shtml.
The Reserve, "Reserve Insured Deposits Program," 2 Sheets, Oct. 4, 2006, http://www.ther.com/bank/bank_insdep.shtml.
The Reserve, "Reserve Insured Deposits," 2 Sheets, Oct. 4, 2006, http://www.ther.com/ps/ps_fif.shtml.
The Reserve, "What Sets Us Apart," 2 Sheets, Oct. 4, 2006, http://www.ther.com/bank/bank_wsua.shtml.
Wilson, "How Cash Management Services Can Help Your Bank Cultivate New Relationships with Commercial Customers," America's Community Banker, vol. 10, Issue 5, Bell & Howell Information and Learning Company, 8 Sheets, May 1, 2001.

"Bank of Oak Ridge to Offer FDIC Insurance on up to $1.5 Million," Dialog Web Command Mode, 2 Sheets, Sep. 25, 2003, http://www.dialogweb.com/cgi/dwclient.
"Man Bites Dog: Funds Move Into Banking," IBC's Money Fund Selector, 2 Sheets, Nov. 6, 1998.
"Reverse Ups Insurance Limit on Money Market Account," Thomson Financial Inc., Mutual Fund Market News, 1 Sheet, Aug. 26, 2002.
"The Bank of New York adds a $300,000 FDIC-Insured Money Market Account Option to its Dividend Income Checking Account," PR Newswire Associations, Inc., PR Newswire, 2 Sheets, Apr. 18, 2002.
"The Reverse Funds to Offer up to $600,000 of FDIC Insurance on Reserve Insured Deposits; Addressing Investor Needs for Increased Safety, Flexibility and a Competitive Yield," Business Wire, Inc. Business Wire, 2 Sheets, Aug. 13, 2002.
Letter From William W. Wiles, Secretary of the Board, Board of Governors of the Federal Reserve System, Jun. 22, 1983, 6 Sheets.
DI 48, Excerpts of Transcript of Hearing, U.S. Dist. Ct., District of Delaware, Civil Action No. 82-680, Apr. 8, 1983, 5 sheets.
DI 56, Interrog. Response, U.S. Dist. Ct. District of Delaware, Civil Action No. 82-680, May 20, 1983, 15 Sheets.
DI 99, Suppl. Interrogatory Response, U.S. Dist. Ct., District of Delaware, Civil Action No. 82-630, May 30, 1984, 6 Sheets.
Letter from Michael Bradfield, General Counsel, Board of Governors of the Federal Reserve System, Nov. 16, 1984, 4 Sheets.
Board of Governors of the Federal Reserve System, 1984 Fed. Res. Interp. Ltr. LEXIS 56, Nov. 16, 1984, 3 Sheets.
Letter From Oliver I. Ireland, Associate General Counsel, Board of Governors of the Federal Reserve System, Jun. 22, 1988, 5 Sheets.
Board of Governors of the Federal Reserve System, 1988 Fed. Res. Interp. Ltr. LEXIS 141, Jun. 22, 1988, 3 Sheets.
Board of Governors of the Federal Reserve System, 1989 Fed. Res. Interp. Ltr. LEXIS 77, Mar. 14, 1989, 2 Sheets.
Board of Governors of the Federal Reserve System, 1989 Fed. Res. Interp. Ltr. LEXIS 154, Jun. 21, 1989, 2 Sheets.
Board of Governors of the Federal Reserve System, 1990 Fed. Res. Interp. Ltr. LEXIS 94, Feb. 1, 1990, 1 Sheet.
Board of Governors of the Federal Reserve System, 1991 Fed. Res. Interp. Ltr. LEXIS 232, Jan. 30, 1991, 2 Sheets.
CMA, The Merrill Lynch Cash Management Account Financial Service, Insured Savings Account Participating Depository Institutions, Merrill Lynch, Pierce, Fenner & Smith Incorporated, Nov. 1992, 2 Sheets.
Board of Governors of the Federal Reserve System, 1994 Fed. Res. Interp. Ltr. LEXIS 156, Jun. 24, 1994, 3 Sheets.
CMA, Insured Savings Account Fact Sheet, Merrill Lynch, Pierce, Fenner & Smith Incorporated, Jul. 1994, pp. 47-54.
Board of Governors of the Federal Reserve System, 1994 Fed. Res. Interp. Ltr. LEXIS 314, Oct. 17, 1994, 2 Sheets.
Board of Governors of the Federal Reserve System, 1994 Fed. Res. Interp. Ltr. LEXIS 419, Oct. 14, 1994, 4 Sheets.
CMA, The Merrill Lynch Cash Management Account Financial Service, Insured Savings Account Participating Depository Institutions, Merrill Lynch, Pierce, Fenner & Smith Incorporated, Mar. 1995, 2 Sheets.
Letter from Stephanie Martin, Assoc. General Counsel, Board of Governors of the Federal Reserve System, Apr. 22, 2004, 8 Sheets.
Bank Deposit Program, Online http://web.archive.org/web/20030620100115/http:/www.smithbarney.com/products_servi, Jan. 19, 2001, 4 Sheets.
Online, www.usabancshares.com, Brave New World, 1999, 2 Sheets.
Lawsuit by Island Intellectual Property LLC, Lids Capital LLC, and Double Rock Corporation against Promontory Interfinancial Network, LLC and MBSC Securities Corporation, including Cover Sheet, Summons, Complaint and Rule 7.1 Statement, Mar. 24, 2009, Case No. 09 CV 2675.
Lawsuit by Island Intellectual Property LLC, Lids Capital LLC, and Double Rock Corporation against Deutsche Bank AG, Deutsche Bank Trust Company Americas and Total Bank Solutions, LLC, including Cover Sheet, Summons, Complaint and Rule 7.1 Statement, Mar. 24, 2009, Case No. 09 CV 2677.

Lawsuit by Promontory Interfinancial Network, LLC against Double Rock Corporation p/k/a Reserve Management Corporation, Complaint, Mar. 24, 2009, Civil Action No. 1:09 CV 316.
Lawsuit by Promontory Interfinancial Network, LLC against Double Rock Corporation p/k/a Reserve Management Corporation and Lids Capital LLC, Amended Complaint, Mar. 27, 2009, Civil Action No. 1:09 CV 316.
Lawsuit by Island Intellectual Property LLC, Lids Capital. LLC, Double Rock Corporation and Intrasweep LLC, against Promontory Interfinancial Network, LLC, Deutsche Bank AG, Deutsche Bank Trust Company Americas and Total Bank Solutions, LLC, Complaint, Apr. 14, 2009, Case No. 09 CV 3750.
Lawsuit by Promontory Interfinancial Network, LLC against Double Rock Corporation, p/k/a Reserve Management Corporation, Island Intellectual Property LLC and Lids Capital LLC, including Cover Sheet, Summons and Complaint, Apr. 14, 2009, Civil Action No. 3:09 CV 217.
Lawsuit by Promontory Interfinancial Network, LLC against Double Rock Corporation p/k/a Reserve Management Corporation, Island Intellectual Property LLC, Lids Capital LLC and Intrasweep LLC, Amended Complaint, Apr. 15, 2009, Civil Action No. 3:09 CV 217.
12 CFR Part 329—Interest on Deposit, Source: 51 FR 10808, Mar. 31, 1986, 5 Sheets.
CMA, Insured Savings Account Fact Sheet, Merrill Lynch, Pierce, Fenner & Smith Incorporated, 1997, pp. 49-57.
CMA, The Investor Credit Line Service, Cost-Effective Financing for the '90s, Merrill Lynch, Pierce, Fenner & Smith Incorporated, 1997, pp. 36-46.
CMA, The Merrill Lynch Cash Management Account Financial Service, Merrill Lynch, Pierce, Fenner & Smith Incorporated, Jan. 1997, 35 Sheets.
Deposit Growth Strategies for Financial Institutions, New Sweep Account Helps Retain $40 Million in Business Deposits, vol. 7, No. 12, The Reserve Funds, May 2001, 1 Sheet.
FDIC, Federal Deposit Insurance Corporation, Letter to Mr. Ronald Rexter, Feb. 28, 2003, From Michelle M. Borzillo, Counsel Supervision and Legislation Section, 2 Sheets.
Financial Services Industry, "Web Watch: Trading Company Bundles CDs for Better Rates," Community Banker, Jun. 2002, online, http://findarticles.com/p/articles/mi_qa5344/is_200206/ai_n21313883/.
FINISTAR, Providing FDIC Insured Funds as a Stable Source of Deposits to Commercial Banking Institutions, 16 Sheets, www.Finistar.com.
Frost Bank, Member FDIC, Checking Accounts, 1 Sheet, Sep. 19, 2003, https://www.frostbank.com/cgi-bin/ecomm/frost1/scripts/products/product_detail.jsp?BV_. . . .
In the Know, Important Information About Your Account, Smith Barney Citigroup, 2005, 6 Sheets.
Letter From Joseph A. DiNuzzo, Counsel, Oct. 20, 1999, FDIC, Federal Deposit Insurance Corporation, 1 Sheet.
Letter From Roger A. Hood, Assistant General Counsel, Jul. 16, 1986, FDIC, Federal Deposit Insurance Corporation, Legal Division, 1 Sheet.
Merriam-Webster Online Dictionary, 10th Edition, Definition of "Associated", 2 Sheets.
Merrill Lynch Announces Beyond Banking, The Power of Advice for Smarter Cash Management, Jan. 8, 2 Sheets.
Merrill Moves CMA Cash to Bank, Street Talk, on Wall Street, Nov. 2000, p. 26.
Merrill Lynch & You, "Financial Services The Way You Want, When You Want Them," Jan. 2000 4 Sheets.
Merrill Lynch, Pierce, Fenner & Smith Incorporated, "Information Statement," 2000, 12 Sheets.
Money Fund Report, Bank of New York Adds Insured Sweeps Option, Friday, May 3, 2002, The Reserve Funds, 1 Sheet.
Money Fund Report, Insured Cash Sweep Options Proliferate, Friday, Jun. 1, 2001, The Reserve Funds, 1 Sheet.
Money Market Insight's, Goldman Sachs May Create Bank to Offer Insured Cash Sweeps, Aug. 2002 Issue, 3 Sheets.
MUNK, Merrill Makes New Push Into Traditional Banking, Dow Jones Newswires, Jan. 3, 2003, 1 Sheet.

O'Brian, "Money-Market Funds Suit Many Investors, But Proud Creator Frets About Extra Risk," Re-Printed From The Wall Street Journal, Monday, Nov. 6, 2000, Dow Jones & Company, Inc., 2 Sheets.
On Wall Street, Helping Brokers Build a More Successful Business, The Power of Cash, Jun. 2002, 2 Sheets.
On Wall Street, Helping Brokers Build a More Successful Business, Unusual Products for Unusual Times, May 2001, 2 Sheets.
Ring, National /Global, "Amex Spans the Globe in Retail Bank Buildup," Nov. 27, 2000, 1 Sheet.
Sweeping Your Firm Into FDIC Insured Deposits, Harken Financial Services, Aug. 4, 2006, 8 Sheets.
Testimony of Bruce R. Bent, CEO of the Reserve Funds, Before the Financial Institutions and Consumer Credit Subcommittee House Financial Services Committee U.S. House of Representative, Hearing on H.R. 758 and H.R. 859, Mar. 5, 2003, 4 Sheets.
The Depository Trust Company, B#: 3875, Oct. 1, 2002, Settlement\ Underwriting, From: Denise Russo, Director, Underwriting, 6 Sheets.
The Reserve Funds, NJBA Endorses New Sweep Account Offers New Jersey Banks Deposit Growth, Retention, for Immediate Release, May 23, 2001, 1 Sheet.
The Reserve Funds, Reserve Management and Irwin Union Bank and Trust Company Partner to Offer the Reserve Return Sweep, for Immediate Release, Mar. 8, 2001, 2 Sheets.
The Reserve Funds, Objectives, Observations & Strategies for American Enterprises Inv., Oct. 18, 2000, 11 Sheets.
The Unmatched Sweep Solution From the Cash Management Expert, 2 Sheets.
Waddell, "Sweeping Clean," Advisor, The Advisor to Advisors, 2 Sheets.
Investors MoneyAccount$^{SM}$, "The FDIC-Insured Money Market Investment with an Important Plus," IMA Oct. 1995, 2 pages.
Bent et al., Office Action, U.S. Appl. No. 10/071,053, with attached SB08, date considered Mar. 10, 2009, 2 pages.
USPTO Office Action, Office Action Summary, U.S. Appl. No. 11/767,827, Date Mailed Jun. 5, 2009, 35 pages.
Service Mark Application, Applicant: Reserve Management Corporation, Mark: Reserve Insured Deposits, (attached Power of Attorney, Declaration, Drawing pPage, Sep. 21, 2001, 6 pages.
Lawsuit by Island Intellectual Property LLC, et al., against Deutsche Bank Trust Company Americas, et al.; Defendant Deutsche Bank Trust Company Americas' Fifth Supplemental Responses to Island IP's First Set of Common Interrogatores to All Defendants (No. 7); Case No. 09 Civ. 2675 (VM)(AJP); Sep. 16, 2010; 9 pages.
Lawsuit by Island Intellectual Property LLC, et al., against Deutsche Bank Trust Company Americas, et al.; Defendant Total Bank Solutions, LLC's Fifth Supplemental Responses to Island IP's First Set of Common Interrogatores to All Defendants (No. 7); Case No. 09 Civ. 2675 (VM)(AJP); Sep. 16, 2010; 9 pages.
U.S. Appl. No. 12/829,961, filed Jul. 2, 2010, Bruce Bent, et al.
Letter from Gilbert T. Schwartz, Skadden, Arts, Slate, Meagher & Flom to Oliver Ireland, Associate General Counsel, Board of Governors of the Federal Reserve System; Dec. 18, 1987; 19 sheets.
Letter from Roger M. Zaitzeff, Seward & Kissel to Gilbert T. Schwartz, Associate General Counsel, Board of Governors of the Federal Reserve System; May 10, 1983, 5 sheets.
Wayne Hummer Money Market Fund Brochure, Performance Data as of Mar. 31, 2003, including Commentary page (attached http://www.whummer.com/funds/money.asp and http://www.whummer.com/fund_dis.htm), 4 pages.
Wayne Hummer Money Market Fund, "Annual Financial Statements," Mar. 31, 2003, 12 pages.
Wayne Hummer Investment Trust, Investment Company Act File No. 811-3880, "Start Investing Today . . . ," Prospectus, Jul. 31, 2002, 44 pages.
Wayne Hummer Management Company, retrieved from the Internet: "Organization & Clients," http://www.whmgmtco.com; "Assets Under Management—Dec. 31, 2002," http://www.whmgmtco.com/asset.htm; "Equity & Mid Cap Growth Investment Philosophy," http://www.whmgmtco.com/equ-phil.htm; "Economic & Market Commentary—Jan. 2003," http://www.whmgmtco.com/commentary.htm; "Management Team," http://www.whmgmtco.com/team.

htm; "Fixed Income Performance," http://www.whmgmtco.com/fixed-perf.htm; "Mid-Cap Equity Performance," http://www.whmgmtco.com/mid-perf.htm; "All Equity Performance," http://www.whmgmtco.com/all-perf.htm, 11 pages [retrieved on Jul. 2, 2003].

Wayne Hummer Market Letter, Jul./Aug. 2003, 2 pages.

Wayne Hummer Investments, "Wintrust Financial Corporation Reports Second Quarter Earnings; Second Quarter Net Earnings Up 45%," Jul. 18, 1 page.

Weber Shandwick Worldwide, News: For Immediate Release, "Wayne Hummer Investments Names New President & CEO," Apr. 2003, 2 pages.

Wayne Hummer Investments, retrieved from the Internet: "Our People Focused On Your Investments," Jul. 2, 2003, http://www.whummer.com/; "Stocks & Bonds," http://www.whummer.com/stocks_bonds.htm; "Mutual Funds," http://www.whummer.com/mutual_funds.htm; "Morning Comments," http://www.whummer.com/morningcomments.asp, 6 pages [retrieved on Jul. 2, 2003].

Wayne Hummer Investments, "Investment Executives," retrieved from the Internet: http://www.whummer.com/investment_executives.htm, 2 pages [retrieved on Jul. 2, 2003].

Wayne Hummer Investments LLC, "Consolidated Statement of Financial Condition," with Report of Independent Auditors, Dec. 31, 2002, 12 pages.

Wintrust Financial Corporation, "Wintrust Financial Corporation Reports Record Earnings for the Fourth Quarter and Year; Fourth Quarter Net Earnings Up 53%," 22 pages.

Wayne Hummer Investments, "A Letter to Wayne Hummer Investments Clients & Friends," Jul. 18, retrieved from the Internet: http://www.whummer.com/wintrust2qEarnings.html, 1 page [retrieved on Jul. 3, 2003].

Wayne Hummer Investments; Insured Bank Deposits Program—Frequently Asked Questions; obtained Dec. 26, 2002; 4 pages.

Wayne Hummer Investments, "Contact Us," retrieved from the Internet: http://www.waynehummer.com/contact_us.htm, 6 pages [retrieved on Jan. 8, 2003].

Wayne Hummer Investments for Life, Booklet, 2003, 25 pages.

Wayne Hummer, "For Time-Proven Professionalism," Booklet, 2003, 13 pages.

Wayne Hummer, "Insured Bank Deposits™ Program Information Statement," obtained Dec. 26, 2002; 12 pages.

U.S. Appl. No. 09/677,535, filed Oct. 2, 2000, Bruce Bent et al.
U.S. Appl. No. 10/825,440, filed Apr. 14, 2004, Bruce Bent et al.
U.S. Appl. No. 11/641,046, filed Dec. 19, 2006, Bruce Bent et al.
U.S. Appl. No. 11/840,052, filed Aug. 16, 2007, Bruce Bent et al.
U.S. Appl. No. 11/840,060, filed Aug. 16, 2007, Bruce Bent et al.
U.S. Appl. No. 12/385,522, filed Apr. 10, 2009, Bruce Bent et al.
U.S. Appl. No. 12/408,507, filed Mar. 20, 2009, Bruce Bent et al.
U.S. Appl. No. 12/408,511, filed Mar. 20, 2009, Bruce Bent et al.
U.S. Appl. No. 12/408,523, filed Mar. 20, 2009, Bruce Bent et al.
U.S. Appl. No. 12/453,387, filed May 8, 2009, Bruce Bent et al.
U.S. Appl. No. 12/453,388, filed May 8, 2009, Bruce Bent et al.
U.S. Appl. No. 12/453,389, filed May 8, 2009, Bruce Bent et al.
U.S. Appl. No. 12/453,390, filed May 8, 2009, Bruce Bent et al.
U.S. Appl. No. 12/622,979, filed Nov. 20, 2009, Bruce Bent et al.

Adler, Joe, "Promontory to Roll Out Deposit Service Insuring Liquid Funds", American Banker, Feb. 22, 2010, 1 sheet.

An iMoneyNet Special Report, Brokerage Cash Sweep Options: The Shift from Money Funds to FDIC-Insured Bank Deposit Accounts, by Peter G. Crane & Michael F. Krasner, iMoneyNet, Nov. 2004, 66 pages.

Litigation Notice After Payment of Issue Fee filed in Parent U.S. Appl. No. 10/382,946, Apr. 3, 2009, 160 pages.

Litigation Notice After Payment of Issue Fee Payment With Attachments filed in Parent U.S. Appl. No. 10/382,946, Apr. 30, 2009, 81 pages.

Email from Olivia Kim to Charles Macedo on May 13, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Deutsche Bank Trust Company America's responses to Double Rock's Common interrogatory Nos. 1-10 to defendants Reservation of Right, Civil Action No. 09 Civ. 2675 (VM) (AJP).

Email from Olivia Kim to Charles Macedo on May 13, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Total Bank Solutions, LLC's responses to Double Rock's Common interrogatory Nos. 1-10 to defendants, Reservation of Right, Civil Action No. 09 Civ. 2675 (VM) (AJP).

Lawsuit by Island Intellectual Property LLC and Intrasweep LLC against Deutsche Bank Trust Company Americas and Total Bank Solutions, LLC, Deutsche Bank Trust Company Americas' answer to plaintiffs' Feb. 23, 2010 complaint and counterclaims, May 4, 2010, Civil Action No. 09 Civ. 2675 (VM) (AJP)(Document 111).

Lawsuit by Island Intellectual Property LLC and Intrasweep LLC against Deutsche Bank Trust Company Americas and Total Bank Solutions, LLC, Total Bank Solutions, LLC's answer to plaintiffs' Feb. 23, 2010 complaint and counterclaims, May 4, 2010, Civil Action No. 09 Civ. 2675 (VM) (AJP)(Document 112).

Lawsuit by Island Intellectual Property LLC and Intrasweep LLC against Institutional Deposits Corp., Consent Order, Apr. 21, 2010, Case No. 09-CV-3079 (Document 44).

Lawsuit by Island Intellectual Property LLC and Lids Capital LLC against Deutsche Bank Trust Company Americas and Total Bank Solutions, LLC, Deutsche Bank Trust Company answer to plaintiffs' Mar. 16, 2010 complaint and counterclaims, May 4, 2010, Civil Action No. 09 Civ. 2675 (VM) (AJP) (Document 113).

Lawsuit by Island Intellectual Property LLC and Lids Capital LLC against Deutsche Bank Trust Company Americas and Total Bank Solutions, LLC, Total Bank Solutions, LLC's answer to plaintiffs' Mar. 16, 2010 complaint and counterclaims, May 4, 2010, Civil Action No. 09 Civ. 2675 (VM)(Document 114).

Promontory Interfinancial Network: Frequently Asked Questions (FAQs), Feb. 5, 2003, 5 pages.

U.S. Appl. No. 12/794,448, filed Jun. 4, 2010, Bruce Bent et al.
U.S. Appl. No. 12/794,545, filed Jun. 4, 2010, Bruce Bent et al.
U.S. Appl. No. 12/816,092, filed Jun. 15, 2010, Bruce Bent, II et al.

Email from Olivia Kim to Charles Macedo on Jun. 9, 2010 with attachement of Lawsuit by Island Intellectual Property LlC, Lids Capital LLC, Double Rock Corporation, and lntrasweep LLC against Deutshe Bank Trust Company Americas and Total Bank Solutions, LLC, Defendant Deutsche Bank Trust Company America's responses to lntrasweep's common interrogatory Nos. 1-5, Confidential—Attorneys only, Civil Action No. 09 Civ. 2675 (VM) (AJP).

Insured Bank Deposit Program Summary Information Statement, Information Statement, and list of Eligible Program Banks Effective Feb. 10, 2005, 11 pages.

Dreyfus Insured Deposit Program, Disclosure Statement and Terms and Conditions, Dreyfus A BNY Mellon Company, 8 Sheets.

Dreyfus Insured Deposit Program, Multiple List Program—Effective May 11, 2009, 1 Sheet.

Finistar Reg. No. 2,939,558, Registered Apr. 12, 2005.

Introducing our MaxSafe CD with up to $700,000 of FDIC Insurance, 4 Sheets.

Lake Forest Bank & Trust Company, Introducing MaxSafe Deposit Accounts with up to $3.75 Million in FDIC Insurance, www.lakeforestbank.com/maxsafe, 2 Sheets.

Lawsuit by Island Intellectual Property LLC, Intrasweep LLC and Double Rock Corporation against Deutsche Bank AG, Deutsche Bank Trust Company Americas and Total Bank Solutions, LLC, Complaint for Patent Infringement, May 19, 2009, Case No. 09 CIV 4673.

Lawsuit by Promontory Interfinancial Network, LLC against Double Rock Corporation p/k/a Reserve Management Corporation, Island Intellectual Property LLC, Lids Capital LLC and Intrasweep LLC, Complaint, May 19, 2009, Civil Action No. 3:09 CV 322.

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Consolidated First Amended Complaint, Jury Trial Demanded, Jun. 11, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Answer and Counterclaims, Answer of Defendant Promontory Interfinancial Network, LLC, Jun. 25, 2009, Case No. 09 CV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Answer and Counterclaims, Answer of Defendant MBSC Securities Corporation, Jun. 25, 2009, Case No. 09 CV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Total Bank Solutions, LLC's Answer to Consolidated First Amended Complaint and Counterclaims, Jun. 25, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Deutsche Bank Trust Company Americas' Answer to Consolidated First Amended Complaint and Counterclaims, Jun. 25, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Jury Trial Demanded, Deutsche Bank AG's Answer to Consolidated First Amended Complaint, Jun. 25, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Promontory Interfinancial Network LLC's Counterclaims, Jul. 9, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant MBSC Securities Corporation's Counterclaims, Jul. 9, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Total Bank Solutions, LLC's Counterclaims, Jul. 9, 2009, Civil Action No. 09 CIV 2675 (VM).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, The Island Plaintiffs' Reply to Defendant Deutsche Bank Trust Company Americas' Counterclaims, Jul. 9, 2009, Civil Action No. 09 CIV 2675 (VM).

Seven Times the Security of a Normal CD, Introducing our MaxSafe CD, 4 Sheets.

The Pershing Press, Dreyfus Insured Deposit Program, Issue 2, Aug. 2008, http://www.pershing.com/news/pershing_press/news_466244.html, 1 Sheet.

Garton, Thomas W.; Are LLC Banks in the Cards? Stay Tuned; Fredrikson & Byron, P.A.; Jun. 2003; http://www.fredlaw.com/articles/banking/bank_0306_twig.html; 2 pages.

Lawsuit by *Island Intellectual Property LLC* v. *Clearview Correspondent Services, LLC, et al.*; Branch Banking & Trust Company's Answer to Complaint and Counterclaims; Civil Action No. 1:11-cv-448-LO-IDD; Jun. 20, 2011; 13 pages.

Lawsuit by *Island Intellectual Property LLC* v. *Clearview Correspondent Services, LLC, et al.*; Clearview Correspondent Services, LLC's Answer to Complaint and Counterclaims; Civil Action No. 1:11-cv-448-LO-IDD; Jun. 20, 2011; 12 pages.

Lawsuit by *Island Intellectual Property LLC* v. *Clearview Correspondent Services, LLC, et al.*; Scott & Stringfellow, LLC's Answer to Complaint and Counterclaims; Civil Action No. 1:11-cv-448-LO-IDD; Jun. 20, 2011; 12 pages.

Lawsuit by *Island Intellectual Property LLC* v. *First Southwest Company*; First Southwest Company's Answer to Complaint and Counterclaims; Civil Action 1:11-cv-371-SD; Jun. 20, 2011; 11 pages.

Lawsuit by *Island Intellectual Property LLC, et al.* v. *Deutsche Bank Trust Company Americas et al.*; Declaration of Olivia M. Kim in Support of Defendants' Motion for Summary Judgment of Invalidity Under 35 U.S.C. § 101; Oct. 6, 2011; Case 1:09-cv-02675-VM, Document 197.

Lawsuit by *Island Intellectual Property LLC, et al.* v. *Deutsche Bank Trust Company Americas, et al.* Plaintiffs' Memorandum of Law in Opposition to Defendants' Motion for Summary Judgment of Invalidity Under 35 U.S.C. § 101; Nov. 2, 2011; Case 1:09-cv-02675-VM, Document 201.

Lawsuit by *Island Intellectual Property LLC, et al.* v. *Deutsche Bank Trust Company Americas, et al.*; Defendants Reply in Support of Their Motion for Summary Judgment of Invalidity Under 35 U.S.C. § 101; Nov. 15, 2011; Case 1:09-cv-02675-VM, Document 208.

Lawsuit by *Island Intellectual Property LLC, et al.* v. *Deutsche Bank Trust Company Americas, et al.*; Defendants' Response to Plaintiffs' Statement of Additional Material Facts in Support of Plaintiffs' Opposition to Defendants' Motion for Summary Judgment of Invalidity Under 35 U.S.C. § 101; Nov. 15, 2011; Case 1:09-cv-02675-VM, Document 209.

Lawsuit by *Island Intellectual Property LLC, et al.* v. *Deutsche Bank Trust Company Americas, et al.*; Supplemental Declaration of Olivia M. Kim in Support of Defendants' Opening and Reply Claim Construction Briefs; Nov. 15, 2011; Case 1:09-cv-02675-VM, Document 207.

Martens, Don W.; letter to Hon. Victor Marrero re. tentative rulings on claim construction in *Island Intellectual Property LLC et al.* v. *Deutsche Bank Trust Co., et al.*; Nov. 28, 2011; Case 1:09-cv-02675-VM, Document 210.

U.S. Appl. No. 12/453,390, filed May 8, 2009, Bruce Bent.

*Island Intellectual Property LLC et al.* v. *Deutsche Bank AG, et al.*; Memorandum and Order; Case 1:09-cv-02675-KBF; Doc. 289; Feb. 14, 2012; pp. 1-28.

*Island Intellectual Property LLC et al.* v. *Deutsche Bank AG, et al.*; Order; Case 1:09-cv-02675-KBF; Doc. 221; Feb. 14, 2012; pp. 1-34.

*Island Intellectual Property LLC et al.* v. *Deutsche Bank Trust Company Americas, et al.*; Declaration of Charles R. Macedo 2 in support of Plaintiffs' motions in limine Nos. 4-6; Case 1:09-cv-02675-KBF; Doc. 260; Feb. 3, 2012; pp. 1-3 and Exhibits.

*Island Intellectual Property LLC et al.* v. *Deutsche Bank Trust Company Americas, et al.*; Defendants' opposition to Plaintiffs' motion in limine #3 to preclude defendants' expert Richard T. Powers from testifying that the Merrill Lynch CMA/ISA product includes omnibus accounts. Case 1:09-cv-02675-KBF; Doc. 269; Feb. 6, 2012; pp. 1-18.

*Island Intellectual Property LLC et al.* v. *Deutsche Bank Trust Company Americas, et al.*; Defendants' opposition to Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 284; Feb. 10, 2012; pp. 1-12.

*Island Intellectual Property LLC et al.* v. *Deutsche Bank Trust Company Americas, et al.*; Memorandum and Order; Case 1:09-cv-02675-KBF; Doc. 265; Feb. 6, 2012; pp. 1-22.

*Island Intellectual Property LLC et al.* v. *Deutsche Bank Trust Company Americas, et al.*; Plaintiffs' brief in support of their motion in limine #3 to preclude defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF; Doc. 247; Jan. 30, 2012; pp. 1-20.
*Island Intellectual Property LLC et al.* v. *Deutsche Bank Trust Company Americas, et al.*; Plaintiffs' memorandum of law in support of motion in limine #4 to preclude evidence and argument regarding Plaintiffs' confidential Oct. 18, 2000 presentation to American Enterprises Investment Services at trial; Case 1:09-cv-02675-KBF; Doc. 262; Feb. 6, 2012; pp. 1-10.
*Island Intellectual Property LLC et al.* v. *Deutsche Bank Trust Company Americas, et al.*; Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 257; Feb. 3, 2012; pp. 1-10.
*Island Intellectual Property LLC et al.* v. *Deutsche Bank Trust Company Americas, et al.*; Plaintiffs' Notice of Motion and Motion in Limine #3 to preclude Defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF, Doc. 246; Jan. 30, 2012; pp. 1-2.
*Island Intellectual Property LLC et al.* v.*Deutsche Bank Trust Company Americas, et al.*; Plaintiffs' notice of motion and motion in limine #3 to preclude testimony of Gilbert Schwartz; Case 1:09-cv-02675-KBF; Doc. 259; Feb. 3, 2012; pp. 1-2.
*Island Intellectual Property LLC et al.* v. *Deutsche Bank Trust Company Americas, et al.*; Plaintiffs' notice of motion and motion in limine #4 to preclude evidence and argument regarding Plaintiffs' confidential Oct. 18, 2000 presentation to American Enterprises Investment Services at trial; Case 1:09-cv-02675-KBF; Doc. 256; Feb. 3, 2012; pp. 1-2.
Knight-Ridder; Money Matters, Tips you can use—Limits Apply as FDIC Insurance Covers Depositor, Not Account; Chicago Tribune; Feb. 4, 1998; 2 pages.
Lawsuit by *Island Intellectual Property LLC et al.* v. *Deutsche Bank Trust Company Americas et al.*; Joint Statement of Claims and Defenses to be Presented at Trial Set for Feb. 27, 2012; Jan. 16, 2012; Case 1:09-cv-02675-KBF (Document 227).
Lawsuit by *Island Intellectual Property LLC, et al.* v. *Deutsche Bank Trust Company Americas, et al.*; Order; Dec. 7, 2011; Case 1:09-cv-02675-VM, Document 212.
Lawsuit by *Island Intellectual Property LLC, et al.* v. *Deutsche Bank Trust Company Americas, et al.*; Special Master's Report and Recommended Decision on Defendants' Summary Judgment Motion of Invalidity Under 35 U.S.C. § 101; Dec. 19, 2011.
Martens, Don W.; letter to Hon. Victor Marrero re. supplement to letter of Nov. 28, 2011 on tentative rulings on claim construction in *Island Intellectual Property LLC et al.* v. *Deutsche Bank Trust Co., et al.*; Nov. 28, 2011; Case 1:09-cv-02675-VM; Document 211.
American Express—Meeting Notes, Sep. 26, 2000, 2 pages.
American Express Conference Call Minutes, Topic: Tiered Balances, Jan. 25, 2001 @ 3:00pm-4:00pm, 2 pages.
American Express Financial Advisors Customized FDIC Product with Tiered Balances, Jan. 24, 2001, 2 pages.
Email to abufalino@vedderprice.com, from S. Johnson, Re: ReserveFunds and Wayne Hummer, dated Jul. 14, 2003 (attached email to S. Johnson, from abufalino@vedderprice.com on Jun. 26, 2003, Re: ReserveFunds and Wayne Hummer), 2 pages.
Fax to T. Vezeau, from L. Boone, Re: BBII's request to fax to you, dated Dec. 26, 2002 (attached Memo to K.A. Jacklin, from A. Rova, Re: Lert discovery, dated Dec. 23, 2002), 3 pages.
Letter to A.J. Bufalino, from C.R. Macedo, Re: Reserve Management Corporation, Wayne Hummer Investments LLC, Our File: 71297/80, dated Jan. 3, 2006, 2 pages.
Letter to A.J. Bufalino, from C.R. Macedo, Re: Reserve Management Corporation, Wayne Hummer Investments LLC, Our File: 71297/80, dated Feb. 23, 2006, 1 page.
Letter to A.J. Bufalino, from C.R. Macedo, Re: Reserve Management Corporation, Wayne Hummer Investments LLC, Our File: 71297/80, dated May 8, 2007, 2 pages.
Letter to A.J. Bufalino, from C.R. Macedo, Re: Reserve Managemen Corporation, Wayne Hummer Investments LLC, Our File: 71297/80, dated Feb. 23, 2006, 1 page.
Letter to A.J. Bufalino, from C.R. Macedo, Re: Reserve Management Corporation, Wayne Hummer Investments LLC, Our File: 71297/80, dated May 8, 2007 (attached Appendices 1-3) 6 pages.
Letter to A.J. Bufalino, from S. Johnson, Re: Response to May 29, 2003 letter/email correspondence, dated Aug. 5, 2003, 1 page.
Letter to A.J. Bufalino, from S. Johnson, Re: Response to May 29, 2003 letter/email correspondence, dated Aug. 5, 2003 (enclosing Jul. 16, 2003 letter to T.M. McDonald, May 29, 2003 fax to B. Bent II, Jan. 10, 2003 letter to R.L. Kratzer, note page), 7 pages.
Letter to A.J. Bufalino, from S. Johnson, Re: U.S.P.N. 6,374,231, dated May 29, 2003, 2 pages.
Letter to A.J. Bufalino, from T.J. Vezeau, Re: U.S.P.N. 6,374,231, dated Feb. 11, 2003, 1 page.
Letter to C.R. Macedo, from A.J. Bufalino, Re: Reserve Management Corporation, Wayne Hummer Investments LLC, Our File: 71297/80, dated Mar. 16, 2006, 1 page.
Letter to C.R. Macedo, from A.J. Bufalino, Re: Reserve ManagementCorporation, Wayne Hummer Investments LLC, Our File: 71297/80, dated Mar. 16, 2006, 1 page.
Letter to J. Van De Graff, from R.L. Kratzer, Re: Reserve Management Corp. Assertion, dated Feb. 13, 2003, 1 page.
Letter to R.L. Kratzer, from T.J. Vezeau, Re: U.S.P.N. 6,374,231, dated Jan. 10, 2003 , 1 page.
Letter to T.J. Vezeau, from A.J. Bufalino, Re: U.S,P.N. 6,374,231, dated Feb. 7, 2003, 1 page.
Letter to T.M. McDonald, from B. Bent II, Re: FDIC insured money market products, dated Jul. 16, 2003, 1 page.
Letter to T.M. McDonald, from B. Bent II, Re: FDIC insured money market products, dated Jul. 16, 2003 (enclosing Jul. 14, 2003 email to abufalino@vedderprice.com, May 29, 2003 letter to A.J. Bufalino, Feb. 13, 2003 letter to J. Van De Graaff, Feb. 11, 2003 letter to A.J. Bufalino, Feb. 7, 2003 letter to T.J. Vezeau, Jan. 10, 2003 letter to R.L. Kratzer), 9 pages.
Memo to Bruce Bent, from Bruce Bent II, Re: S&M Status, Oct. 15, 1997 (cc: Arthur, Mary, Marianne, Joe, Pat, Cathy, Michelle), 1 page.
Memo to Marianne, Pat, Bruce Bent, from Bruce Bent II, Re: Reserve Insured Deposit Account, Sep. 4, 1997, 1 page.
Memo to Marianne, Ralph, Customer Service, from Bruce Bent II, Re: Reserve IDA, Sep. 4, 1997, 1 page.
U.S. Appl. No. 11/932,762, filed Oct. 31, 2007, Bent et al.
U.S. Appl. No. 12/271,705, filed Nov. 14, 2008, Bent et al.
U.S. Appl. No. 12/025,402, filed Feb. 4, 2008, Bent et al.
U.S. Appl. No. 12/340,026, filed Dec. 19, 2008, Bent et al.
U.S. Appl. No. 12/408,507, filed Mar. 20, 2009, Bent et al.
U.S. Appl. No. 12/408,511, filed Mar. 20, 2009, Bent et al.
U.S. Appl. No. 12/408,523, filed Mar. 20, 2009, Bent et al.
U.S. Appl. No. 12/453,387, filed May 8, 2009, Bent et al.
U.S. Appl. No. 12/453,388, filed May 8, 2009, Bent et al.
U.S. Appl. No. 12/453,389, filed May 8, 2009, Bent et al.
U.S. Appl. No. 12/453,390, filed May 8, 2009, Bent et al.
U.S. Appl. No. 12/622,979, filed Nov. 20, 2009, Bent et al.
U.S. Appl. No. 12/638,544, filed Dec. 15, 2009, Bent et al.
U.S. Appl. No. 12/684,071, filed Jan. 7, 2010, Bent et al.
U.S. Appl. No. 12/686,797, filed Jan. 13, 2010, Bent et al.
American Banker The Financial Services Daily, "New Pitch: Deposit Insurance Sharing", by Rob Blackwell, Jan. 21, 2003, 2 pages.
Case for "CORE" Deposits, Historic Degree of Stability, 2006, 1 page.
Deutsche Bank Insured Deposit Program, Marketing Literature 2007, 3 pages.
Federal Register: Oct. 9, 1997 (vol. 62, No. 196), pp. 52809-52868. http://www.fdic.gov/news/news/inactivefinancial/1997/fil97111b.html.
Garmhausen, "Matching Small Banks with Large Muni Deposits," American Banker, Online The Financial Services Resource, Oct. 4, 2005, 4 pages, http://www.finstar.com/docs/AmericanBanker.html.

Hencke, "New Rules for FDIC deposit Insurance", *ABA Bank Compliance*, vol. 20, No. 7, Jul./Aug. 1999, pp. 31-37.

IDC Deposits, online, http://idcdeposits.com/ Feb. 23, 2005, 5 Sheets.

Jong et al., "The Valuation and Hedging of Variable Rate Savings Accounts," University of Amsterdam, Nov. 15, 2001, 23 Sheets.

Lawsuit by Carlo DeBlasio et al. against Merrill Lynch & Co., Inc. et al., Declaration of Andrew W. Stern, including Exhibits A, B, C, D, E and F, Nov. 11, 2007, Case No. 07-cv-318 (RJS) (Document 59).

Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 72).

Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: "Client Commitment"; "Get Started Today"; "Total Merrill"; "Guideline for Business Conduct"; "Commitment to Clarity"; "Cash Management Account"; "Information Statement Regarding Changes to Interest Rates on Deposits in Merrill Lynch Banks"; . . . Feb. 5, 2008 (Document 71).

Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 73).

Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 74).

Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 75).

Lawsuit by Carlo DeBlasio et al. against Merrill Lynch & Co., Inc. et al., Declaration of Kenneth I. Schacter, including Exhibits A, B, C, D, F, G, H, I, J, K, L, M, N, O, P, Q and R, Nov. 14, 2007, Case No. 07-cv-318 (RJS) (Document 69).

Lawsuit by Carlo DeBlasio et al. against Merrill Lynch & Co., Inc. et al., Declaration of Mathew J. Terry in Support of Motion to Dismiss by Defendants Wachovia Corporation, Wachovia Securities, LLC, Wachovia Bank, N.A., and Wachovia Bank of Delaware, N.A., including Exhibits A, B, C and D, Nov. 14, 2007, Case No. 07-318 (RJS) (Document 67).

Lawsuit by Carlo DeBlasio et al. against Merrill Lynch & Co., Inc. et al., Declaration of Scott D. Musoff in Support of The Merrill Lynch Defendants' Motion to Dismiss The Second Amended Class Action Complaint, ECF Case, Nov. 12, 2007, Case No. 07-cv-318 (RJS) (Document 64).

Lawsuit by Carlo DeBlasio et al. against Merrill Lynch & Co., Inc. et al., Reply Declaration of Kenneth Schacter including Exhibits S and T, Mar. 6, 2008, Case No. 07-cv-318 (RJS) (Document 81).

Lawsuit by Carlo DeBlasio et al. against Merrill Lynch & Co., Inc. et al., Second Amended Class Action Complaint, Jury Trial Demanded, Introduction and Summary of Allegations, Jun. 11, 2007, Case No. 07-cv-318-VM.

Lawsuit by Carlo DeBlasio et al. against Merrill Lynch & Co., Inc. et al., Supplemental Declaration of Matthew J. Terry in Support of Motion to Dismiss by Defendants Wachovia Corp., Wachova Securities, LLC, Wachovia Bank N.A., and Wachovia Bank of Delaware, N.A., including Exhibits A and B, Mar. 6, 2008, Case No. 07-cv-318 (RJS) (Document 79).

Lawsuit by Carlo DeBlasio, et al. against Merrill Lynch & Co., Inc., et al., Opinion and Order Regarding Motions, Jul. 27, 2009, Case No. 07 CIV 318(RJS).

Lawsuit by Island Intellectual Property LLC and Intrasweep LLC against Institutional Deposits Corp., Complaint for Patent Infringement, Jury Trial Demanded, Nov. 4, 2009, Civil Action No. 09 CV 3079.

Lawsuit by Island Intellectual Property LLC and Intrasweep LLC, Answer of Defendant Institutional Deposits Corp. to Complaint for Patent Infringement, Dec. 10, 2009, Case No. 09 CV 03079 (JEC), (Document 16).

Lawsuit by Island Intellectual Property LCC, Lids Capital LLC, Double Rock Corporation and Intrasweep LLC against Deutsche Bank AG, Deutsche Bank Trust Company Americas and Total Bank Solutions, LLC, Stipulated Dismissal of Deutsche Bank AG Without Prejudice, Nov. 19, 2009, Civil Action No. 09 CIV 2675 (VM) (AJP) (Document 79).

Lawsuit by Island Intellectual Property LLC, Lids Capital LLC, Double Rock Corporation and Intrasweep LLC against Deutsche Bank Trust Company Americas and Total Bank Solutions, LLC, Deutsche Bank Trust Company Americas' First Amended Answer to Consolidated First Amended Complaint and Counterclaims, Dec. 4, 2009, Civil Action No. 09 CIV 2675 (VM) (AJP), (Document 86).

Lawsuit by Island Intellectual Property LLC, Lids Capital LLC, Double Rock Corporation and Intrasweep LLC against Deutsche Bank Trust Company Americas and Total Bank Solutions, LLC, Total Bank Solutions, LLC's First Amended Answer to Consolidated First Amended Complaint and Counterclaims Dec. 4, 2009, Civil Action No. 09 CIV 2675 (VM) (AJP) (Document 87).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Stipulated Dismissal of Counts I-III of Defendant Promontory Interfinancial Network, LLC's, Counterclaim with Prejudice, Oct. 19, 2009, (Document 68).

Lawsuit by Island Intellectual Property LLC, Lids Capital LLC, Double Rock Corporation and Intrasweep LLC against Promontory Interfinancial Network LLC, MBSC Securities Corporation, Deutsche Bank AG, Deutsche Bank Trust Company Americas and Total Bank Solutions, LLC, Stipulation and Order, Oct. 29, 2009, Case No. 09 CV 2675 (VM) (AJP) (Document 73).

Letter to William R. Burdette, CEO, Apr. 6, 2009, FDIC, Federal Deposit Insurance Corporation, 2 pages.

Letter to William R. Burdette, CEO, Nov. 15, 2007, FDIC, Federal Deposit Insurance Corporation, 5 Sheets.

Promontory Interfinancial Network, Promontory Interfinancial Network Announces New Deposit Placement Service, Jan. 21, 2003, 3 Sheets.

Promontory Interfinancial Newtork: Frequently Asked Questions (FAQs), Feb. 5, 2003, 5 pages.

Total Bank Solutions, Bank Sweep FAQs http://www.totalbanksolutions.com/sweepbnkfaqs.htm, Sep. 23, 2005, 2 pages.

Total Bank Solutions, Bank Sweep FAQs, http://www.totalbanksolutions.com/sweepbnkfaqs.htm, Nov. 2, 2005, 3 pages.

Total Bank Solutions, Bank Sweep Products, Deutsche Bank, http://www.totalbanksolutions.com/banksweep.htm, Sep. 23, 2005, 1 page.

Total Bank Solutions, Bank Sweep Products, http://www.totalbanksolutions.com/banksweep.htm, Appendix 3, Oct. 18, 2005, 2 pages.

Total Bank Solutions, Bank Sweep Products, http://www.totalbanksolutions.com/banksweep.htm, Nov. 2, 2005, 2 pages.

Total Bank Solutions, Brokerage Sweep FAQs, http://www.totalbanksolutions.com/brokerfaqs.htm, Nov. 2, 2005, 3 pages.

Total Bank Solutions, Brokerage Sweep, http://www.totalbanksolutions.com/brokersweep.htm, Nov. 2, 2005, 1 page.

Total Bank Solutions, Deposit Bank FAQs, http://www.totalbanksolutions.com/depositbnkfaqs.htm, Nov. 2, 2005, 2 pages.

Total Bank Solutions, Deposits, Deutsche Bank, http://www.totalbanksolutions.com/deposits.htm, Sep. 23, 2005, 1 page.

Total Bank Solutions, Deposits, http://www.totalbanksolutions.com/deposits.htm, Nov. 2, 2005, 2 pages.

Total Bank Solutions, Deutsche Bank Insured Deposit Program, DB Insured Deposit Program Features, http://www.totalbanksolutions.com/features.htm, Sep. 23, 2005, 2 pages.

Total Bank Solutions, Deutsche Bank Insured Deposit Program, http://www.totalbanksolutions.com/, Sep. 23, 2005, 1 page.

Total Bank Solutions, http://www.totalbanksolutions.com/, Mar. 16, 2007, 8 pages.

Total Bank Solutions, http://www.totalbanksolutions.com/overview.htm, Nov. 2, 2005, 1 page
Total Bank Solutions, Insured Deposit Program Features, http://www.totalbanksolutions.com/features.htm, Nov. 2, 2005, 2 pages.
Total Bank Solutions, Insured Deposit Program, http://www.totalbanksolutions.com/Insureddeposits.htm, Nov. 2, 2005, 2 pages.
Total Bank Solutions, Partners & Affiliates, http://www.totalbanksolutions.com/partners.htm, Nov. 2, 2005, 3 pages.
Total Bank Solutions, Partners & Affiliates, http://www.totalbanksolutions.com/partners.htm, Oct. 25, 2005, 3 pages.
Total Bank Solutions, Strategic Partners, Nov. 2, 2005, 1 page.
Total Bank Solutions, TBS Deposit Account, About Our Broker Products, http://www.totalbanksolutions.com/brokerproducts.htm, Sep. 7, 2005, 2 pages.
Total Bank Solutions, TBS Management Team, http://www.totalbanksolutions.com/management.htm, Appendix 1, Oct. 18, 2005, 1 page.
Total Bank Solutions, TBS Management Team, http://www.totalbanksolutions.com/management.htm, Nov. 2, 2005, 2 pages.
Total Bank Solutions, TBS Management Team, http://www.totalbanksolutions.com/management.htm, Oct. 25, 2005, 2 pages.
TotalBank Solutions, TBS Bank Deposit Account, Oct. 2004, 6 pgs.
TotalBank Solutions, web.archive.org/web/20050126044216/http://totalbanksolutions.com, Jan. 26, 2005, 2 pgs.
USA Mutual Partners Insured Cash Shelter Account Terms and Conditions, 11 pages, 2009 USA Mutuals Partners, Inc.
Wachovia Securities, Important Information for Clients Concerning Changes in Automatic "Sweep" Arrangements, Oct. 1, 2003, 6 sheets.
Litigation Notice After Payment of Issue Fee with Attachments filed in U.S. Appl. No. 10/382,948, Apr. 3, 2009, 160 pages.
Litigation Notice After Payment of Issue Fee with Attachments filed in U.S. Appl. No. 10/382,948, Apr. 30, 2009, 81 pages.
U.S. Appl. No. 09/677,535, filed Oct. 2, 2000, Bent et al.
U.S. Appl. No. 10/305,439, filed Nov. 26, 2002, Bent et al.
U.S. Appl. No. 11/149,278, filed Jun. 10, 2005, Bent et al.
U.S. Appl. No. 11/641,046, filed Dec. 19, 2006, Bent et al.
U.S. Appl. No. 11/689,247, filed Mar. 21, 2007, Bent et al.
U.S. Appl. No. 11/767,827, filed Jun. 25, 2007, Bent et al.
U.S. Appl. No. 11/767,837, filed Jun. 25, 2007, Bent et al.
U.S. Appl. No. 11/767,846, filed Jun. 25, 2007, Bent et al.
U.S. Appl. No. 11/767,856, filed Jun. 25, 2007, Bent et al.
U.S. Appl. No. 11/840,064, filed Aug. 16, 2007, Bent et al.
U.S. Appl. No. 11/840,060, filed Aug. 16, 2007, Bent et al.
U.S. Appl. No. 11/840,052, filed Aug. 16, 2007, Bent et al.
Federal Register: Oct. 9, 1997 (vol. 62, No. 196), pp. 52809-52868 http://www.fdic.gov/news/news/inactivefinancial/1997/fil97111b.html.
Lawsuit by Carlo DeBlasio et al. against Merrill Lynch & Co., Inc. et al., Declaration of Joel P. Laitman in Support of Plaintiffs' Memorandum of Law in Opposition to Defendants' Motion for Dismissal of the Second Amended Class Action Complaint, Including: "Client Commitment"; "Get Started Today"; "Total Merrill"; "Guideline for Business Conduct"; "Commitment to Clarity"; "Cash Management Account"; "Information Statement Regarding Chances to Interest Rates on Deposits in Merrill Lynch Banks"; . . . Feb. 5, 2008 (Document 71).
Lawsuit by Island Intellectual Property LLC and Intrasweep LLC agaiinst Institutional Deposits Corp., Complaint for Patent Infringement, Jury Trial Demanded, Nov. 4, 2009, Civil Action No. 09 CV 3079.
Lawsuit by Island Intellectual Property LLC, Lids Capital LLC, Double Rock Corporation and Intrasweep LLC against Deutsche Bank AG, Deutsche Bank Trust Company Americas and Total Bank Solutions, LLC, Stipulated Dismissal of Deutsche Bank AG Without Prejudice, Nov. 19, 2009, Civil Action No. 09 CIV 2675 (VM) (AJP) (Document 79).
Total Bank Solutions, http://www.totalbanksolutions.com/overview.htm, Nov. 2, 2005, 1 page.
Scottrade Bank Deposit Program—Terms, Conditions & Disclosures; Author unknown; 8-11; pp. 1-3.

SYSTEMS AND METHODS FOR PROVIDING ENHANCED ACCOUNT MANAGEMENT SERVICES FOR MULTIPLE BANKS

This application is a Continuation of application Ser. No. 10/382,946, filed Mar. 6, 2003, now U.S. Pat. No. 7,536,350, which is a Continuation-in-Part of application Ser. No. 09/677,535, filed Oct. 2, 2000, now U.S. Pat. No. 7,752,129, and is a Continuation-in-Part of application Ser. No. 10/071,053, filed Feb. 8, 2002, now U.S. Pat. No. 7,519,551, both of which are Continuations-in-Part of application Ser. No. 09/176,340, filed Oct. 21, 1998 and now U.S. Pat. No. 6,374,231. Application Ser. No. 10/382,946 filed Mar. 6, 2003 also claims benefit of Provisional Application Ser. No. 60/442,849, filed Jan. 27, 2003. The entirety of the disclosure of each of these applications is incorporated herein by reference for all purposes.

FIELD OF THE INVENTION

The present invention provides systems and methods that deliver account management services to multiple participating financial institution (including banks) so that they may offer to their customers interest-earning, deposit accounts without withdrawal restrictions and/or with enhanced deposit insurance. This invention's management methods preferably maintain each participating financial institution's total customer funds on deposit.

BACKGROUND OF THE INVENTION

It would be desirable if depositors and investors could obtain fully-insured, interest-bearing accounts with an unlimited number of transactions or withdrawals per month. However, present statutory and regulatory requirements, which in the United States ("US") are generally codified as Title 12 of the United States Code ("U.S.C.") (Banks and Banking), restrict the flexibility of banks and savings institutions, and limit investors and depositors seeking investments and deposits having a lower risk profile to a rather limited selection of choices, all of which suffer inhibiting constraints.

First, Title 12 U.S.C. Chapter 3 (Federal Reserve System), along with Title 12 Code of Federal Regulations ("C.F.R.") Chapter II Part 204 (12 C.F.R. §§204.1-204.136) (Federal Reserve Board ("FRB") Regulation D) and Title 12 C.F.R. Chapter II Part 217 (12 C.F.R. §§217.1-217.101) (FRB Regulation Q), prevents certain financial institutions from paying interest on deposit accounts that permit unlimited (at least more than six) monthly withdrawals of deposited funds (known as "demand deposit accounts" or "DDAs"). More specifically, 12 C.F.R. 329.2 states that "no bank shall, directly or indirectly, by any device whatsoever, pay interest on any demand deposit". A "deposit" is any money placed into a checking account, savings account, Certificate of Deposit (CD), or the like. In a "demand" account, the owner can make an unlimited number of funds transfers to another account (having the same or a different owner), or to a third party, typically by bank drafts, checks, credit cards, and debit cards. In other words, an account in which a depositor has the ability to make six or more monthly transfers will be deemed a demand account and no interest will be payable on the funds deposited therein (unless the funds of a non-commercial entity are held in a NOW account under 18 U.S.C. 1832(a)). Owners of demand accounts are denied interest on their funds.

Second, 12 U.S.C. §1821(a) limits government-guaranteed deposit insurance provided by the Federal Deposit Insurance Corporation ("FDIC") to a maximum coverage of $100K (K=1,000) for each owner of (or, generally, each ownership interest in) funds deposited in a single insured institution. The FDIC, created under Title 12 U.S.C. Chapter 3 (the Federal Deposit Insurance Corporation), provides insurance for deposits in most United States banks through its Bank Insurance Fund ("BIF") and in most United States savings institutions through its Savings Association Insurance Fund ("SAIF"). The rules governing insurance of deposits in institutions insured by the BIF and the SAIF are the same, and base insurance coverage on the concept of ownership rights and capacities. Funds held in different ownership categories are insured separately from each other; and funds owned by the same ownership category but held in different accounts at the same financial entity are subsumed under the same insurance coverage limit.

Banks and other savings institutions have developed several approaches, which include money-market mutual fund sweeps and re-purchase agreement ("repo") sweeps, offered by third parties in an effort to compete with those financial institutions, for example broker/dealers, who are able to offer interest on cash balances for all their customers including commercial customers by using money-market mutual funds. However, these approaches are disadvantageous in that they involve a removal of commercial customer deposits from the bank's balance sheets into the assets of the money market-mutual fund provider, and also of the deposits from FDIC protection. This disadvantage is especially burdensome for smaller banks, such as regional or local banks.

Therefore, what is needed are systems and methods for providing fully-insured (i.e., with insurance that may exceed $100,000), interest-bearing accounts with an unlimited number of transactions per month without removing net deposits from participating financial institutions. It would be especially advantageous if these systems could be readily integrated into the existing infrastructure of a bank, savings institution, credit union, or other financial institution in a manner that would minimally disrupt these institution's existing customer relationships.

Citation or identification of any reference in this section or any section of this application shall not be construed that such reference is available as prior art to the present invention. Further, headings and sub-headings are used for convenience and clarity only; they are not to be interpreted in any limiting fashion.

SUMMARY OF THE INVENTION

The present invention overcomes deficiencies in the prior art by providing systems and methods that extend in a novel and advantageous manner certain prior inventions made by one or more of the current inventors. These prior inventions may be briefly summarized as follows (for the purposes of this invention only and without any limitation).

In prior application Ser. No. 09/176,340, filed Oct. 21, 1998 and now U.S. Pat. No. 6,374,231 B1 (the "parent invention") (which is incorporated herein by reference in its entirety for all purposes) systems and methods are disclosed for managing demand accounts of multiple customers of any financial institution. That invention invests the customer account funds in a single aggregated investment account at a bank, and manages the single investment account so that the account funds invested therein earn interest and are insured, while providing for customer deposits and unlimited withdrawals by use of a wide range of financial networks and services. However, insurance for individual customer accounts is limited by the $100K FDIC maximum-coverage limit, so balances over $100,000 are not insured.

Prior application Ser. Nos. 09/677,535, 10/071,053, and 60/372,347 (which are incorporated herein by reference in its entirety for all purposes) disclose various improvements of the above invention. Prior application Ser. No. 10/071,053, filed Feb. 8, 2002, adapts the above invention to banks, especially smaller banks, that wish to retain close customer relationships and additionally do not wish their ability to make loans affected by sweeping deposited funds to a money-market mutual fund or a difficult-to-manage repurchase program (where assets must be collateralized), because deposited funds can be important as a source for funding loan demand. In that invention, systems and methods are provided that act as an agent of a bank to assist in transferring ("sweeping") funds between customer demand-deposit accounts and interest-earning, insured, investment accounts ("money market" accounts) maintained in the bank. The provided systems integrate closely with the bank's existing systems, and may optionally interface with external financial network and service systems.

Prior application Ser. No. 09/677,535, filed Oct. 2, 2000, overcomes the $100K limit on individual deposit insurance by providing systems and methods managing multiple insured investment accounts with each account held at a separate bank (or other financial institution). The invention transfers the bank-customer's funds among the separate banks so that no customer of the bank has more than $100K invested in any one of the separate banks. Deposits are managed also to earn interest while being available for unlimited withdrawals by use of a wide range of financial networks and services. Accordingly, customers of the bank with demand account balances exceeding $100K may be now covered by FDIC insurance available through multiple banks, although deposit balances exceeding approximately $100K must be transferred out of the initiating bank.

Prior application Ser. No. 60/372,347, filed Apr. 12, 2002 adds a flexible interest rate feature to the above inventions. According to this feature, a financial institution (or a bank) may pay interest on a customer account that depends on a wide range of factors, for example, on the balance in the customer account, on the total customer balance at the financial institution, on marketing considerations, and so forth.

Accordingly, the objects of the present invention include systems and methods that provide participating financial institutions with the ability to offer to customers deposit accounts an unlimited number of monthly transactions while improving upon these prior inventions.

It is an object of the invention that the funds deposited in the insured, interest-earning, deposit accounts at participating financial institutions remain on the institutions' books and available for normal business purposes, such as a source for loan funding; or in other words, that the methods of this invention maintain each participating institutions total deposited funds.

It is another object of the invention that funds deposited in the deposit accounts at participating financial institutions earn interest.

It is another object of the invention that interest may be earned on customer deposits at interest rates based on plural discrete tiers (or on a more smooth function) selected in accordance with each customer's account parameters such as current cash balance, nature of the customer-financial entity relationship, and so forth.

It is another object of the invention that funds deposited in one of the interest-earning, deposit accounts at the participating financial institutions are fully FDIC-insured, whether or not they exceed $100K.

It is another object that the systems and methods of the invention be readily integrable into the existing institutional infrastructure and have minimal impact on presently-existing customer relationships.

It is another object of the invention that its methods and system to permit customers to deposit funds into, and to withdraw funds from, an account by use of many financial instruments networks, and services, and to accept and process customer deposit/withdrawal transactions however presented, such as in periodic batches or files.

These objects are met at least in part by systems and methods that manages a novel arrangement of accounts, especially pairs of demand deposit and money market accounts holding funds from plural customer sub-accounts at the participating banks, that is particularly advantageous in view of the applicable United States banking laws and regulations. To simplify subsequent descriptions, the following paragraphs describe aspects of the banking environment of this invention and explain certain terms used throughout the description.

Concerning the banking environment, generally, relevant banking laws and regulations prohibit institutions from paying interest on deposit accounts not subject to any withdrawal restrictions whatsoever (referred to as "demand accounts," or as "demand deposit accounts" abbreviated as "DDA"), while permitting interest on deposit accounts subject to withdrawal restrictions, such as a required withdrawal notice (referred to as "savings accounts").

Nevertheless, certain deposit accounts not requiring withdrawal notice but subject to other withdrawal restrictions may still be deemed "savings accounts" capable of earning interest. For example, accounts known as money market deposit accounts ("MMDA") that do not require withdrawal notice (but may so require it at any time) are nevertheless deemed savings accounts capable of earning interest if withdrawals or transfers to third parties are limited to less than six monthly. (See 12 C.F.R. §204.2(d)(1).). But certain types of transfers from MMDAs are exempt from this six-withdrawal limit. (See 12 C.F.R. §204.2(d)(2).) Specifically, an unlimited number of monthly transfers may be made between an interest-earning MMDA account and a DDA account if (i) both accounts are in the same financial institution (or bank), (ii) both accounts are registered in the same name, and (iii) transfers are ordered in person, such as by messenger or other agent. An unlimited number of deposits into savings accounts or MMDAs is always allowed.

Second, the $100K FDIC insurance limitation is determined per-beneficial-ownership category per-insured institution, and is not determined on a per-account basis. For example, all ownership interests of a single person (or other entity) held in a single insured institution, whether they are held in multiple separate accounts and whether they are held in a single account pooled with the interests of others, are all aggregated for purposes of the $100K coverage limitation. Further, a person's ownership interests in separate insured institutions are treated separately, and are separately aggregated in each institution for purposes of the separate $100K coverage limitation available in each institution. (See 12 U.S.C. §1821(a)(1)(C).) Consequently, a person's deposit coverage will not be reduced or jeopardized if it is combined with the interests of others in a single account, and may be increased if that person's ownership interests are deposited in separate or aggregated accounts in multiple institutions.

Therefore, this invention establishes and manages a pair of identically-registered accounts (referred to as a "MMDA-DDA pair") in one or all of the financial institutions (or banks) participating in an implementation of this invention. One account of each pair is an interest-earning MMDA subject to withdrawal limitations; the other account is a DDA not subject to any withdrawal limitations and therefore not interest-earning. Funds deposited in participating banks by participating customers are invested and held in the MMDAs in the participating institutions. Participating customers may be, for example, individuals, business entities, governmental entities, and so forth, because MMDA depositors may be of many organizational types. The DDA of each pair serves merely as a conduit through which to withdraw or transfer funds from (and, optionally, to) the paired MMDA. Since both accounts of each account-pair are identically registered at each participating bank, and since fund transfers from the MMDA through the paired DDA are ordered in person (by messenger or other agent), funds invested in the MMDA continue to earn interest even though they may be withdrawn through the paired DDA without restriction. In this manner, this invention achieves its objectives while comporting with the above-described banking environment.

In many embodiments, an organization entity (referred to as an "operating entity" or as an "administrator") has responsibility for the previously-described account pairs, along with other accounts maintained and managed by this invention, and for funds transfers among the accounts. In particular, the MMDA-DDA account pairs in the participating banks may registered as "administrator (or organizational name of the operating entity) as agent for designated customers." The operating entity typically will act as an agent for the participating customers and the participating banks according to agreements entered into when customers or banks become participants in implementations of this invention. The administrator (or other operating entity) may also manage and operate the systems and methods of the present invention. The administrator, or operating entity, may be structured according to the many known forms of business organization, such as proprietorship, partnership, joint venture, corporation, and the like. Also, the administrator may be a business entity independent of all participating banks, or may be a subsidiary of one of the participating banks, or may be a joint venture of the banks, Next, for convenience and clarity, the following terms used in the present specification have the following meanings. First, the term "financial institution" (and "participating financial institution") refers to institutions that may participate in the present invention by virtue of having certain preferred characteristics. One characteristic is that participating financial institutions offer accounts against which customers may make a variety of deposit and withdrawal transactions, where different types of participating institutions may offer customers different types of transactions. Another preferred characteristic is that a participating financial institution offer interest-bearing, insured MMDA-type accounts, or be associated in some fashion with a financial institution that does offer such accounts. Such MMDAs are generally offered by banks, and because the present invention manages participating customer accounts by investing their funds in one or more MMDAs, a participating financial institution derives greater benefit from the invention if it receives some value for these MMDA investments by being associated with one or more banks holding these MMDA investment accounts. In particular, banks may be participating financial institutions and receive direct benefit from the methods of the present invention by both offering customer accounts and providing MMDAs for investment, which may be available according to this invention as deposit accounts for other participating financial institutions. Also, broker/dealers, investment advisors, insurance companies, and so forth that may be participating financial institutions. Here, the funds of the customer accounts are invested in MMDAs in a bank designated by participating institution. A designated bank may not have any particular affiliation with the designating financial institution, or may be affiliated or associated in manners known in the art (for example, a corporate entity with a banking subsidiary and a broker/dealer, an insurance, or an investment advisory subsidiary, or a bank or bank holding company with a broker/dealer subsidiary, or so forth).

Therefore, generally, the term financial institution refers to all such preferred institutions with any banking association or affiliation permitted by law and regulation. However, for convenience and clarity but without limitation, the following description is often in terms of embodiments where participating institutions are banks holding both customer accounts and the investment MMDAs. If some participating customer accounts are in, for example, a broker/dealer, it is to be understood that the associated MMDA-DDA pair is held in the affiliated or associated bank. Also, where customer accounts are referred to in the banking embodiment as DDAs, it is also to be understood that in general customer accounts may also be broker/dealer accounts, investment advisory accounts, and so forth.

Customers of a participating financial institution (or bank) may individually choose whether or not one or more of their accounts at that institution will participate in the enhanced insurance and management services of this invention. Managed accounts are referred to as "participating customer accounts," of for convenience, simply as "customer accounts" or even as "customers." Without limitation, a single individual customer may have non-participating accounts at participating institutions, or may have two or more participating accounts at the same or at different participating institutions, or so forth.

Funds deposited in a participating customer account are referred to as that "customer's participating funds" or more simply as "customer's funds" or as "participating funds." Also, all participating funds held in the participating customer accounts at a single participating financial institution are referred to as that institution's "aggregate (or total) participating customer funds," and all funds held at an institution for all participating customers (not just that institution's customers) are referred to as the institutions "aggregate (or total) participating deposits."

Where attention is focused on a particular one of the participating institutions, it will often be referred to as "this institution," while the remaining participating institutions will be then referred to as the "other institutions." Further, the institution of a customer account, that is the institution at which the customer transacts business for that account, is referred to as the "primary institution" for that customer account or customer; other participating banks are "secondary banks" for that customer account or customer. Each participating customer account (or customer) has exactly one primary bank.

Commonly-available deposit insurance (for example, FDIC insurance) often limits coverage to a certain maximum for all the funds of a single ownership category in a single insured institution. It is often preferable for embodiments of this invention to limit the maximum amount of a single customer's funds held in a single institution to a "target amount" (or "target") which is less than the maximum coverage of the available deposit insurance. The target amount is often 99%, or 98%, or 95% or 90%, or other convenient percentage of the coverage limitation. In the case of FDIC insurance, a preferred target amount is 95% of the coverage limitation of $100K, or $95K; other exemplary target amounts may be $90K or $98K or $99K or other amount. Less preferably, the target amount may be 100% of the coverage limitation.

Also, the following abbreviations may be used in this specification and figures: "acct." for account; "cust." for customer; "DDA" for demand deposit account; "inst." for financial institution (such as a bank); "MM" for money market; "MMDA" for money market demand account; "xaction" for transaction.

Now, in view of the above-described banking environment, this invention's objectives are achieved as follows. Generally, the administrator (or operating entity) of an embodiment of the systems and methods of this invention provides account services to multiple participating customers (at least one) with accounts at multiple participating financial institutions (at least two). The administrator establishes and maintains in each participating bank one of the above-described MMDA-DDA account pairs and allocates and invests participating customer funds in the interest-earning MMDA accounts in amounts guided by objectives and rules selected so that objects of this invention are achieved.

A first preferred objective is to allocate and invest customer funds so that each customer has available a substantial maximum amount of deposit insurance available in each particular embodiment consistent with the practicalities of financial transaction processing. Where the available deposit insurance has fixed coverage limits in each participating institution, this objective may be achieved by a rule according to which no more than the target amount of funds (alternatively, no more than the insurance coverage limitation) is invested in each participating institution (or in an associated or affiliated institution). By the use of a target amount, the methods of this invention are able to practically provide a substantial maximum of deposit insurance for a customer. It is preferably that the target amount be as close to the coverage maximum as is consistent with practical transaction administration and processing. If full insurance coverage is not possible, because, for example, the customer account balance exceeds the coverage limitation (or the target amount) times the number of participating institutions, then excess uninsured funds are preferably kept at the customer's primary institution.

More generally, this invention's first objective is to reduce each customer's risk of loss. Preferably deposit insurance is available, and this objective is achieved by the above-described rules which fully insures a customer's deposits if possible. Where deposit insurance is not available for some or all of a customer's deposits, risk may be reduced by dividing a customer's deposits across such participating institutions that are financially independent of each other. For example, customer deposits in excess of the maximum insurance available in an embodiment of this invention, may be spread evenly across the participating institutions. Alternatively, customer deposits may be invested according to rules prescribed by the that customer For example, the customer may provide a list of participating institutions prioritized for allocation and investment.

A second preferred objective is not to impact each participating institutions total deposited funds. A corresponding rule is that for any transfer of customer funds out of a financial institution to reduce risk of loss, there should be a substantially equal transfer of other participating funds into this institution. For example, if the customers of a participating bank have placed $100M into the program, then $100M in deposits should remain on the bank's balance sheet, whether these are deposits of the bank's own customers or of customers of other participating banks (or financial institutions). This objective is advantageous to institutions which use their deposits for important business purposes, for example, for funding loans.

Investment and allocation of participating funds may also be guided by secondary objectives which should be satisfied if possible without jeopardizing the two previous preferred objectives. One preferred secondary objective advantageous to participating institutions is to not allocate a customer's funds away from that customer's primary bank unless necessary. For example, customers accounts with balances less than $95,000 should not be allocated to other participating banks. However, meeting the primary (preferred) objectives may make meeting this secondary objective impossible in certain situations. Also, when a customer's balance cannot be fully insured, the excess uninsured funds should be retained in the primary institution. Alternatively, a secondary objective advantageous to customers is to reduce risk by allocating a customer's deposits substantially equally among all independent participating institutions.

In preferred embodiments the allocation and investment processes carry out the invention's objectives with both reasonable accuracy and efficiency by acting in a transaction-by-transaction fashion. Customer funds may be allocated to reduce risk on a transaction-by-transaction basis, with each customer transaction being allocated to a single institution (which may be the primary institution). Transactions are customer withdrawals and deposits of all kinds. To maintain the integrity of each institution's total deposits, the present invention may itself initiate transfer of customer funds between institutions. Most preferably, part of all of customer's funds in one institution may be transferred to another institution. In this preferred embodiment, each institution's deposits can be exactly maintained. Invention processing preferably occurs on a regular basis, for example, on an hourly, or a daily, or a weekly basis, and the like, but the invention is not so limited. In most embodiments, it is expected that processing is performed each business day.

In a preferred embodiment, investment of customer funds to reduce risk is coupled to transferring funds between institutions to preserve total deposits, and both are triggered daily to process the batch of customer transactions received for that day. For example, as each customer transaction is processed, it is assigned to the customer's composite account, which represents all transactions that have posted to the client's account. After being posted to the composite accounts, transactions are then allocated to a selected sub-account, each subaccount being associated with one participating bank and representing that portion of the customer's funds in that participating bank. If this assignment would cause that customer's allocated funds to exceed the target amount in that participating bank, then the transaction is assigned to a sub-account associated with another participating bank in order to maintain or maximize deposit insurance for that customer. After all transactions have been assigned, funds are re-allocated between banks without compromising the customers' deposit insurance so that each bank's total participating deposits equals the total participating deposits of its own customers. Preferably, customer funds are re-allocated only between secondary banks, and are not transferred out of the customer's primary bank.

The methods of this invention are performed by systems including such data processing components and facilities as are understood in the art to be necessary or preferred for performing such financial methods. These system receive and post customer transactions, allocate and invest customer funds in participating institutions, issue commands and requests to cause funds transfers among institutions, including in person requests to move funds from a MMDA in a participating (or affiliated or associated) bank to its paired DDA, and track and store records for transactions, fund transfers, and fund allocations in a database.

These system preferably inter-operate with financial systems of the participating institutions for the exchange of necessary data and commands, and may inter-operate differently with different institutions. Generally, inter-operation with institutions may be arranged in one of two configurations. In a first configuration known as a sweep-type arrangement, the systems of this invention inter-operate on the behalf of a participating institution's customers primarily with the systems of that institutions alone (and not with external systems). The institution's own systems then interface to external payment and funds transfer networks on the behalf of its customers, collect their transactions, settle transaction with the external networks, and then provide participating customer transactions to systems of this invention, for example, as daily transaction files. The systems of this invention then receive, allocate, and invest transactions for the institution's participating customers, and inter-operate with the institution's systems to cause funds transfers between the institution and the other participating institutions to preserve deposit positions.

In one variation of this configuration, the institution maintains its own accounts (for example, DDA accounts) for participating customers with minimum balances targeted to cover customers' observed and expected deposit and payment patterns. For example, the target minimum balance may be a percentage based on past account use of the total balance. Customer account funds in excess of these target minimum balances are swept to and from the systems and accounts of this invention for management by the methods of this invention.

In a second configuration, the systems of the present invention take a more active role in the management of participating customer accounts at a participating institution. Here, this invention's systems directly interface to external payment and funds transfer networks on behalf of the institution's participating customers and collect customer transactions. These systems may then settle on the behalf of the institution with some or all of the external financial networks, or assist the institution to do so, and will thereby directly accumulate daily customer transaction files for allocation and investment among the participating (or affiliated or associated) banks.

Also institutional systems and the system of this invention may inter-operate in overlapping configurations. The participating institution may collect and settle transactions with some external financial networks, while the invention performs these functions with other financial networks. Here, transaction files from the institution may be merged with transaction files accumulated by this invention's systems prior to funds allocation. This invention may inter-operate with different participating institutions in the same embodiment according to either configuration.

In a further embodiment a system, method and program product is disclosed for managing funds, in a plurality of financial institutions participating in a program, for a plurality of primary client transaction accounts of a plurality of primary clients, with each respective primary client having funds that were accepted for deposit in a primary client transaction account held in the name of the primary client at one of the plurality of financial institutions in the program, with that financial institution referred to as a primary financial institution for that primary client, the system comprising: one or more electronic databases, stored on one or more computer-readable media, comprising: (1) aggregated transaction account information for a plurality of Federal Deposit Insurance Corporation (FDIC)-insured and interest-bearing aggregated deposit accounts held in a plurality of banks, N, in a program, wherein funds from client transaction accounts of a plurality of clients are aggregated with funds of other client transaction accounts in the aggregated deposit accounts held in the banks in the program; and (2) client transaction account information for each of the respective client transaction accounts comprising: (a) respective balances in the respective client transaction accounts; (b) transaction data for a plurality of the clients; and (c) client's funds held in said plurality of the insured and interest-bearing aggregated deposit accounts; a first computation engine configured on the one or more computers that are operably connected to the one or more databases, for computing, for each of a plurality of respective primary client transaction accounts, a respective excess amount by which a balance of funds in that primary client transaction account in its respective primary financial institution exceeds a specified amount; a first allocation engine configured on the one or more computers, for allocating a plurality of the respective excess amounts associated with one of the financial institution, to one or more of the aggregated deposit accounts in a different one or more of the financial institutions, with each respective excess amount allocated associated with a different respective primary client transaction account of the one financial institution; a second computation engine configured on the one or more computers, for determining a first amount comprising a sum of a plurality of the excess amounts determined for a plurality of primary client transaction accounts in the one financial institution that were or are to be allocated to one or more of the aggregated deposit accounts in one or more of the other financial institutions; a second allocation engine configured on the one or more computers, for allocating to the one financial institution a second amount of funds comprising funds associated with more than one primary client transaction account of one or more of the other financial institutions from one or more of the aggregated deposit accounts at one or more of the other financial institutions, with the second amount based on a difference between a sum of funds deposited in the one or more aggregated deposit accounts of the one financial institution associated with the program and a sum of current balances in all of the primary client transaction accounts of the primary clients in the program associated with the one financial institution; an update engine configured in the one or more computers, for updating or having updated, in the one or more electronic databases, the balance of funds held by each respective primary client in the respective primary client transaction account of the primary client and an amount or respective amounts of such funds held in one or more of the plurality of aggregated deposit accounts in the plurality of financial institutions based on operations of the first and second allocation engines; and an instruction generator configured on the one or more computers, for generating and outputting at least one instruction to transfer funds between aggregated deposit accounts based at least in part on results of one or more of the operations of the first and second allocation engines.

BRIEF DESCRIPTION OF THE FIGURES

The present invention may be understood more fully by reference to the following detailed description of the preferred embodiments of the present invention, illustrative examples of specific embodiments of the invention and the appended figures in which.

DETAILED DESCRIPTION OF THE PREFERRED EMBODIMENTS

Preferred embodiments of the methods and systems of the invention summarized above are next described. Although the following description is primarily directed to embodiments where the participating financial institutions are banks, the participating financial institution may be non-banks (e.g., broker/dealers, investment advisory firms, and so forth) that are associated or affiliated with a bank as described above. Also, although customer accounts may be described as DDA accounts, it is understood that customer accounts may also be at non-banks and then may have characteristics different from DDAs in banking institutions.

Account Structures in the Preferred Embodiments

Figure 1:
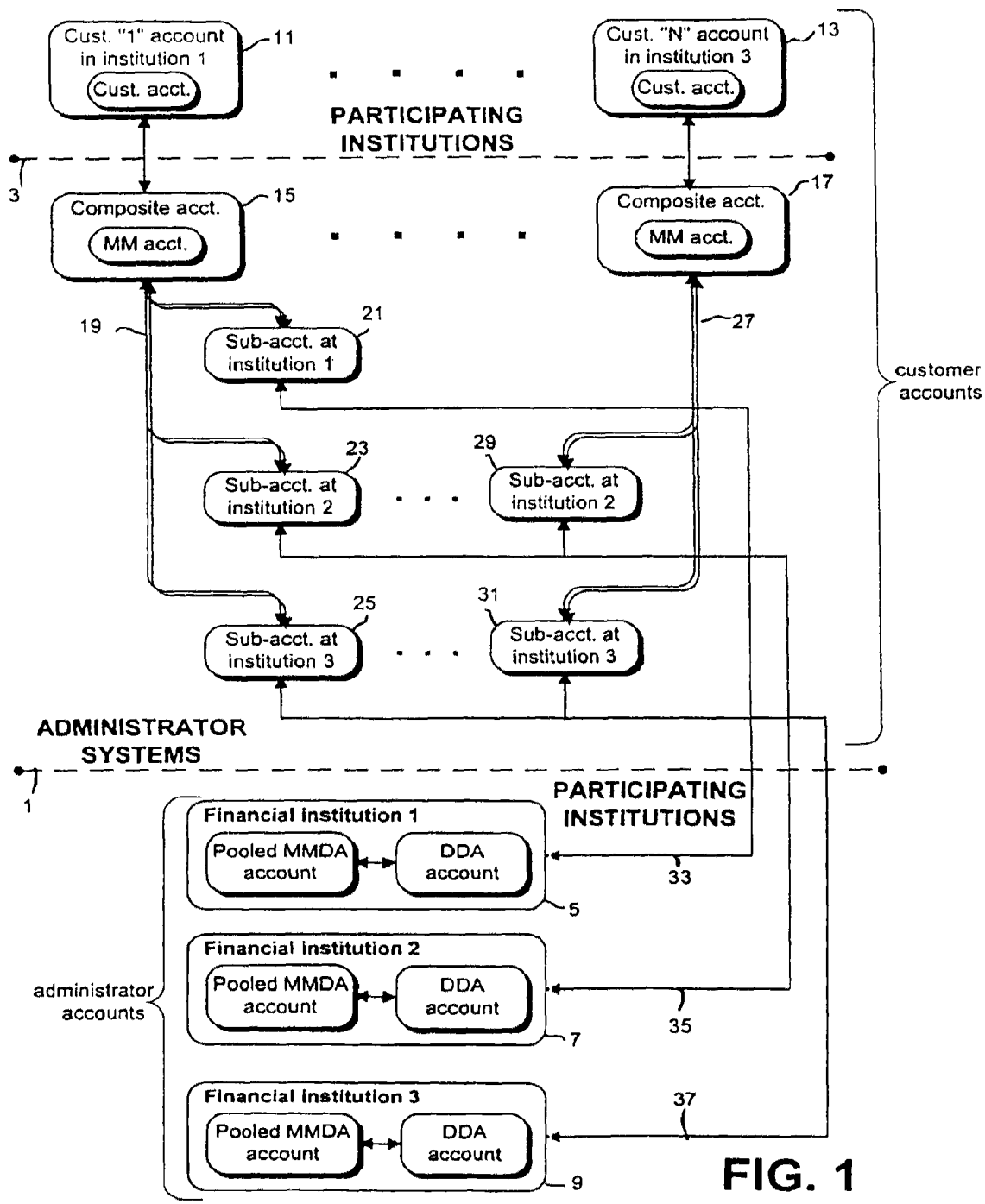
FIG. 1 illustrates exemplary account structures maintained by this invention.

In preferred embodiments, the present invention establishes and maintains linked administrator and customer accounts in order to efficiently perform its processing. FIG. 1 illustrates exemplary account structures for a number, N, of customers at three financial institutions.

In particular, the accounts above separator line 3 represent for customers who are participating in this invention their managed accounts at their primary participating financial institutions. Accounts displayed between separator lines 1 and 3 are registered or related to specific customers at the participating institutions, are used by the administrator according to the methods of this invention to manage the customer's participating funds. Records for these accounts are stored in this invention's databases (also referred to as the "administrator databases"). Specifically, a customer's composite account (one only) represents that customer's total funds managed by this invention, while each sub-account of a customer's (one or more) represents the portion of that customer's managed funds held in the participating financial institution associated with the sub-account, where each sub-account is associated with one participating financial institution.

Finally, accounts displayed below separator 1 are registered to the administrator (or operating entity) of an embodiment as agent for the participating customers ("administrator accounts"). These accounts are each in a bank associated with one participating financial institution, which holds the actual funds represented by the account, and are managed by the administrator according to the methods of this invention. Records for these accounts are also stored in the administrator's databases. Funds of all the customer sub-accounts associated with each participating institution are held by the administrator (as agent for the customers) in the administrator accounts in the associated or affiliated banking institution. (Where the participating institutions are banks, the bank is its own "associated" institution.) Although the present description focuses on embodiments with one or two administrator accounts per participating financial institution, in other embodiments the administrator may maintain a number of such accounts in each institution as is convenient.

Considering first the administrator accounts (below separator line 3), this invention establishes and maintains in each participating financial institution (or its associated banking entity) an interest-earning and insured MMDA account paired with a corresponding coupled DDA, the latter without withdrawal restrictions. The MMDA and DDA of each account pair are identically registered in each participating (or associated or affiliated) bank, for example as "Administrator as Agent for the Designated Customers" (or "Operating_entity_name as Agent for the Designated Customers," or a name with equivalent legal effect). FIG. 1 illustrates MMDA-DDA account pairs 5, 7, and 9 held the in three separate participating financial institutions, institutions 1, 2, and 3.

As described above, participating customer deposits are invested (or held) in the MMDAs at the various participating banks where they earn interest until needed to settle customer payments. Each MMDA will usually hold participating funds for a plurality of customers (a "pooled" MMDA). When funds are withdrawn from an MMDA to settle customer payment transactions, this invention, first, generates instructions for a messenger (or other similar person or agent) to request in-person transfer of the funds from the MMDA to the coupled DDA, and second, automatically transfers the funds from the DDA. Funds may be directly deposited into the MMDAs of each account pair, or funds may be indirectly deposited into an MMDA through its coupled DDA.

Thus, for example, to withdraw funds from the pooled MMDA account of pair 9, a messenger is instructed to request financial institution 3 to transfer selected funds from that MMDA to its identically-registered, coupled DDA. Once in the DDA of pair 9, funds may be automatically (that is electronically) withdrawn as necessary. The embodiment of FIG. 1 deposits funds into MMDAs through the coupled DDAs.

Turning next to the customer-related accounts (above separator line 3), FIG. 1 indicates schematically (by " . . . ", a notation used elsewhere in FIG. 1) a plurality of participating, original accounts owned by a plurality of N customers, which are distributed among the three financial institutions. Only two exemplary participating original accounts, original customer account 11 for customer 1 of financial institution 1 and original customer account 13 for customer N of financial institution 3, are explicitly illustrated. Where the participating institution is a bank, the original customer accounts may configured according to various regulatory possibilities, but typically will be a demand deposit account (DDA) without withdrawal limitations that the customer uses to make payments and to receive deposits. Where the participating institution is not a bank (but is associated or affiliated with a bank at least for the purposes of this invention), the original customer accounts will be appropriate to that institution (e.g., a broker/dealer, investment advisory firm, a insurance company, or other type of financial institution offering customer accounts).

Participating funds (funds that actually participate in the methods of this invention) from each participating (original) customer account is accounted for by a single composite account, which represents total managed funds of that customer wherever the funds are currently deposited/invested. Further, each single composite account will have one or more attached sub-accounts, which represent that customer's funds actually held at the various participating (or affiliated or associated) banks. FIG. 1 (between separators lines 1 and 3) explicitly illustrates composite account 15, representing participating funds from customer account 11, and composite account 17, representing participating funds from customer account 13. Typically, all the funds in a customer's original account will participate in and be managed by this invention. Alternatively, a certain percentage or dollar amount of customer funds may be retained in the customer's original account in the original financial institution in order to settle transactions arising between the periodic funds-allocation processing of this invention. This percentage or amount may be determined automatically based on the history of a customer's original account, or may be set by the customer, or may be otherwise determined.

Composite accounts represent both a customer's total funds participating in this invention, and also by means of sub-accounts they also represent the allocation and investment of a customer's participating funds in the MMDA-DDA pairs maintained in the participating financial institutions. In the preferred embodiments, this allocation and investment is represented by one or more sub-accounts (and stored sub-account data) that are conceptually part of each composite account. In other words, if funds of a composite account have been allocated to and invested in the MMDA-DDA pair maintained in a particular financial institution, then that composite account will have a separate sub-account representing this allocation and investment. Because a customer's funds are preferably invested in the customer's original financial institution to the extent possible, each composite account will have a sub-account (referred to as the "primary" sub-account) representing allocation and investment in the primary institution. Where a customer's funds are invested in two or more financial institutions, the composite account will have in addition to its primary sub-account one or more secondary sub-accounts representing investments in the secondary financial institutions. In all cases, the sum of all sub-account balances will equal the balance of the parent composite account.

For example, FIG. 1 illustrates that composite account 15 for client 1 includes 19 three sub-accounts: primary sub-account 21 represents customer 1's funds that are allocated 33 to MMDA-DDA pair 5 in financial institution 1; secondary sub-account 23 represents funds allocated 35 to account pair 7 in financial institution 2; and secondary sub-account 25 represents funds allocated 37 to account pair 9 in financial institution 3. Sub-account 21 is primary because financial institution 1 is customer 1's original and primary institution, while sub-accounts 23 and 25 are secondary. Customer 1 has three sub-accounts to provide deposit-insurance coverage because the composite account balance is between two and three time the deposit-insurance target amount (for example, between $190-285K). Next, for customer N, composite account 17 includes 27 two sub-accounts: secondary sub-account 29 representing funds allocated 35 to financial institution 2; and primary sub-account 31 representing funds allocated 37 to financial institution 3. Customer 2's sub-accounts provide deposit insurance coverage for balances between the target amount and twice the target amount (for example, between $95-190K).

This invention may assign to each participating bank a unique code that is then used to identify the primary bank to which each composite and sub-account belongs.

Funds Allocation Processing in the Preferred Embodiments

Using this account structure, preferred methods for allocating participating customer funds among the participating banks are now described, commencing with the rules and objectives which guide funds allocations and followed by a preferred implementation of these rules and objectives.

Participating customer funds are generally invested according to a process which implements a number of rules in order to satisfy to the extent possible the goals and objectives of this invention. These rules are generally divided into primary rules and secondary rules. It is highly preferable that any allocation of participating funds always satisfy the primary rules. However, depending on the number of customers, the size of their participating funds, their primary banks, and so forth, no allocation of participating funds may be possible which satisfies both the primary and the secondary rules. In these situations, it is preferred that the secondary rules be satisfied to the extent possible.

In preferred embodiments, funds investment or allocation is guided by two (a first and a second) primary allocation rules and by one or more secondary allocation rules. The first primary rule, advantageous to participating customers, is to allocate a customer's participating funds among the MMDA-DDA pairs in order that the customer receives the maximum possible deposit insurance. This is achieved by never allocating a customer's participating funds so that a bank has more than the target amount when another bank is allocated less than the target amount. If the total amount of a customer's participating funds is equal to or less than a maximum insurance threshold, which is equal the target amount (or less preferably, the actual FDIC-maximum-coverage amount) times the number of participating banks, then all that customer's funds can be covered by deposit insurance. In the contrary case, where a customer's participating funds exceed the maximum insurance threshold, then one or more banks must hold more than the target amount of that customer's funds. In both cases, this first primary rule allocates funds so that the each customer's deposit insurance coverage is maximized.

The second primary rule is to allocate all participating funds so that each bank has on deposit an aggregate amount of funds equal to that bank's participating funds, whether or not the deposited funds are owned by customers of that bank. Stated differently, the total of the funds of all participating customers at a participating bank is considered herein as that bank's aggregate or total participating funds. If the funds of one or more customers must be transferred to other participating banks for insurance coverage according to the first primary rule, then according to this second primary rule an equal amount of funds should be transferred from other banks to this bank in order to maintain this bank's aggregate funds on deposit. This rule is advantageous to participating banks, especially smaller banks, because a bank's aggregate deposits can be sources of income, for example, by being available for loans.

Processing of these primary allocation rules by the methods of this invention provides participating banks with the ability to provide increased FDIC insurance over the $100,000 coverage limits to their bank and/or brokerage customers by allocating and investing their participating customer's balances in excess of $95,000 (or other target amount) in interest bearing deposit accounts at other banks. The bank does not lose deposits held on its balance sheet, since it receives reciprocal deposits, equal to deposits transferred out, transferred in from other banks participating in this invention. For example suppose bank A has a customer account with a balance of $300,000. Because FDIC Insurance covers only the first $100,000 of this balance, by dividing the additional $200,000 equally between bank B and bank C, bank A can provide this customer with full FDIC coverage. Since bank A does not want to lose the $200,000 in deposits, the methods of this invention will transfer to bank A $200,000 in deposits from other participating banks (perhaps, but not necessarily, banks B and C).

Because for non-bank participating institutions the original customer accounts may not be insured, this invention permits these institutions to offer deposit insurance for (some or all) of their customer accounts for the first time. Similarly, this invention provides the participating institution's affiliated or associated bank with total deposits equal to the managed funds from the participating institution Thereby both affiliated or associated institution benefit.

One preferred secondary rule aims to never transfer customer funds unless necessary to meet the first two primary rules. For example, it is preferred not to transfer funds for a customer who has less that the target amount (for example, $95K) of funds on deposit. Also, a customer's funds that exceed the maximum insurance coverage provided by this invention (which equals the target amount times the number of participating banks) should remain in that customer's primary bank. Even though situations may arise where this rule cannot be met for all customers, a preferred allocation method will satisfy this rule for many of the participating customers.

Another preferred secondary rule is that it is preferable for customers of a bank to earn the rate of return specified by the primary bank regardless of which other participating banks hold these customers' funds. This rule may be simply satisfied by allocating the interest earned on investments in each bank's MMDA account to the customers of that bank, wherever their deposits are allocated. Since the allocation methods provide each bank with aggregate total deposits equal to the aggregate total deposits of its participating customers, the total amount of interest it pays will be the equal the amount of interest it would have paid if no participating customer funds had been transferred from the bank. By allocating this amount of interest among its customers in its normal fashion, all these customers will receive their specified and expected rate of interest. Accordingly, it is preferable for participating banks to retain interest earned on their respective MMDAs and to allocate this interest to their own customers.

Aspects of these allocation rules can be illustrated by the following example having two participating banks, Bank A and Bank B, presented in Tables 1-4. Table 1 illustrates hypothetical balances for both banks prior to the allocation processing of this invention according to which Bank A (B) has $100M ($50M) deposited in participating accounts and these account have $12M ($9M) of balances in excess of the preferred insurance-coverage target amount of $95K.

TABLE 1

| TOTAL | Bank A | Bank B |
|---|---|---|
| Participating deposits | $100M | $50M |
| Balances $0-95K | $88M | $41M |
| Balances $95-190K | $12M | $9M |

Table 2 restates the data of Table 1 in a format identifying at each bank the source of deposits. Table 2 illustrates that before allocation processing, Bank A (B) holds deposits of only Bank A's (B's) own customers.

TABLE 2

| TOTAL | Bank A | Bank B |
|---|---|---|
| Aggregate deposits | $100M | $50M |
| Accounts with balances $0-95K | | |
| Cust. of Bank A | $88M | 0 |
| Cust. of Bank B | 0 | $41M |
| Accounts with balances $95-190K | | |
| Cust. of Bank A | $12M | 0 |
| Cust. of Bank B | 0 | $9M |

In order that the participating customers are fully covered by deposit insurance (the first primary rule), all account balances over $95K must be moved out of their primary bank to a secondary bank. Table 3 (in rows six and seven) illustrates this reallocation of $12M ($9M) of deposits of Bank A's (B's) customers to the MMDA in Bank B (A). Although all customers are now insured, Bank A's total aggregate deposits of $97M are less than its total participating deposits of $100M, and Bank B's total aggregate deposits of $53M exceed its total participating deposits of $50M. In order words the second primary rule is not met.

TABLE 3

| TOTAL | Bank A | Bank B |
|---|---|---|
| Aggregate deposits | $97M | $53M |
| Accounts with balances $0-95K | | |
| Cust. of Bank A | $88M | 0 |
| Cust. of Bank B | 0 | $41M |
| Accounts with balances $95-190K | | |
| Cust. of Bank A | 0 | $12M |
| Cust. of Bank B | $9M | 0 |

Therefore, to satisfy the second primary rule, $3M must be transferred from Bank B to Bank A. Since no funds from accounts with balances over $95K (all from Bank A's customers) may be transferred without some of these Bank A customers losing insurance coverage, $3M in funds from accounts with deposits less than $95K (all from Bank B's customers) must be transferred. Table 4 (in row 4) illustrates the final allocation meeting both primary rules.

TABLE 4

| TOTAL | Bank A | Bank B |
|---|---|---|
| Aggregate deposits | $100M | $50M |
| Accounts with balances $0-95K | | |
| Cust. of Bank A | $88M | 0 |
| Cust. of Bank B | $3M | $38M |
| Accounts with balances $95-190K | | |
| Cust. of Bank A | 0 | $12M |
| Cust. of Bank B | $9M | 0 |

In this example the secondary rule is violated. Certain customers of Bank B whose accounts have a balance less than $95K must have funds transferred from their primary bank even though this is not preferred. Due to a greater need for increased deposit insurance coverage by Bank A, certain Bank B customers that do not require increased deposit insurance have had their accounts transferred to Bank A in order to meet the two primary objectives.

Now the preferred processes implementing these rules and objectives will be described. Generally, these processes perform funds allocation in a manner that sufficiently approximates an exact solution to the rule-constrained funds allocation problem; preferably, the funds allocation satisfies exactly the allocation rules. The allocation process is usually performed on a regular basis with a frequency determined by characteristics the participating customers and financial institutions. In the case of retail customers of banks and similar institutions, allocation processing is preferably performed on a daily or twice-daily basis during the business week. In situations where customer transactions are relatively infrequent, processing may be performed weekly or monthly. In other situations where typical customer transactions are comparable to the size of the target amount, then more frequent, even transaction-by-transaction processing, processing may be advantageous.

Figure 2:
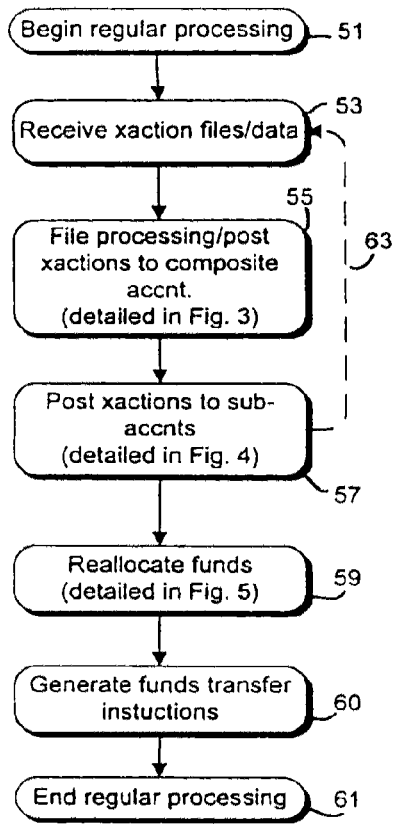
FIG. 2 illustrates periodic processing performed by this invention.

FIG. 2 illustrates in outline a preferred embodiment of regular processing, however frequently performed. After regular processing is triggered and commences 51, its first activities are to receive transaction data for customer transactions that have occurred since that last regular processing 53. These transactions will in most cases require funds reallocation because customer balances are changed. Transactions may be received from the participating financial institutions, usually in batches such as transaction files. Alternatively, transaction may be received directly by the methods and system of this invention from external transaction sources, such as payment and funds transfer networks, and stored in batches or files for later processing. Once transaction batches or files have been received for all participating customers, they are initially processed 55 and applied to customer composite accounts stored in system databases.

Steps 57 and 59 are the heart of the regular funds allocation process. Step 57 first posts all received customer transactions to customer composite accounts, and then allocates the posted transactions to customer sub-accounts in a manner that provides full deposit-insurance coverage (or a maximum of coverage if full coverage is not possible). After step 57, although the first primary rule is satisfied, the second primary rule may not be satisfied: one or more individual participating institutions may have total aggregate deposits that are more or less than the participating deposits of the own customers (referred to as "out of balance"). Accordingly, step 59 reallocates funds in customer sub-accounts among the participating institutions to insure that the institutions are brought into balance. After transaction allocation processing of step 57 and sub-account re-allocation processing of step 59, instructions are generated 60 and transmitted to cause transaction settlement and funds transfer between participating institutions. Regular processing terminates at step 61.

In alternative embodiments, the principal steps, receiving transaction data, allocating transactions, and re-allocating sub-account funds, may be performed in different orders. For example, if the participating institutions may tolerate being out of balance to a certain degree, then receiving transaction data and allocating transactions may be repeatedly performed 63 in a regular fashion as above while sub-account-fund reallocation is performed only when the out of balance condition exceeds the tolerable degree.

Figure 3:
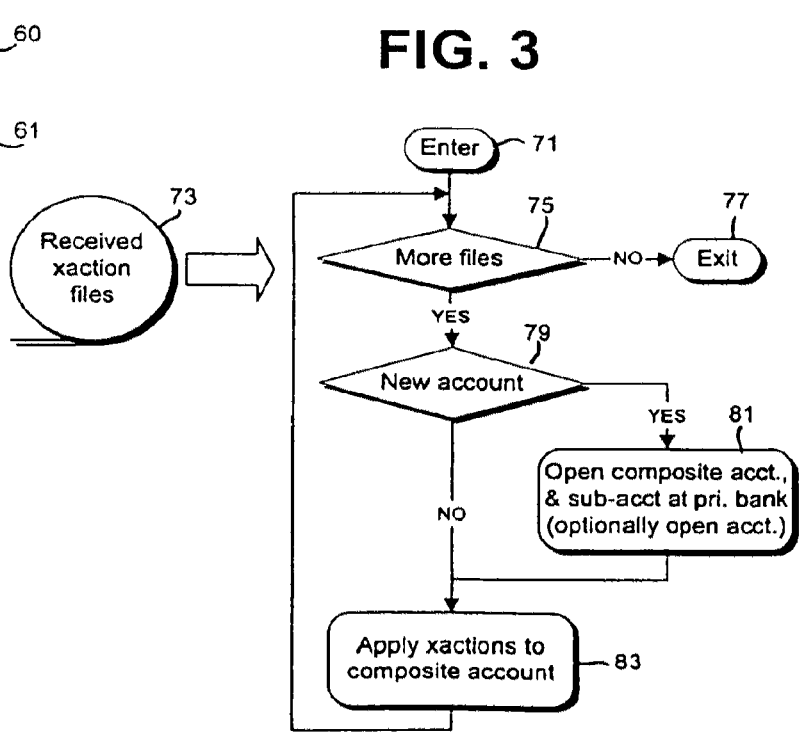
FIG. 3 illustrates file-processing steps of the periodic processing of this invention.
Figure 4:
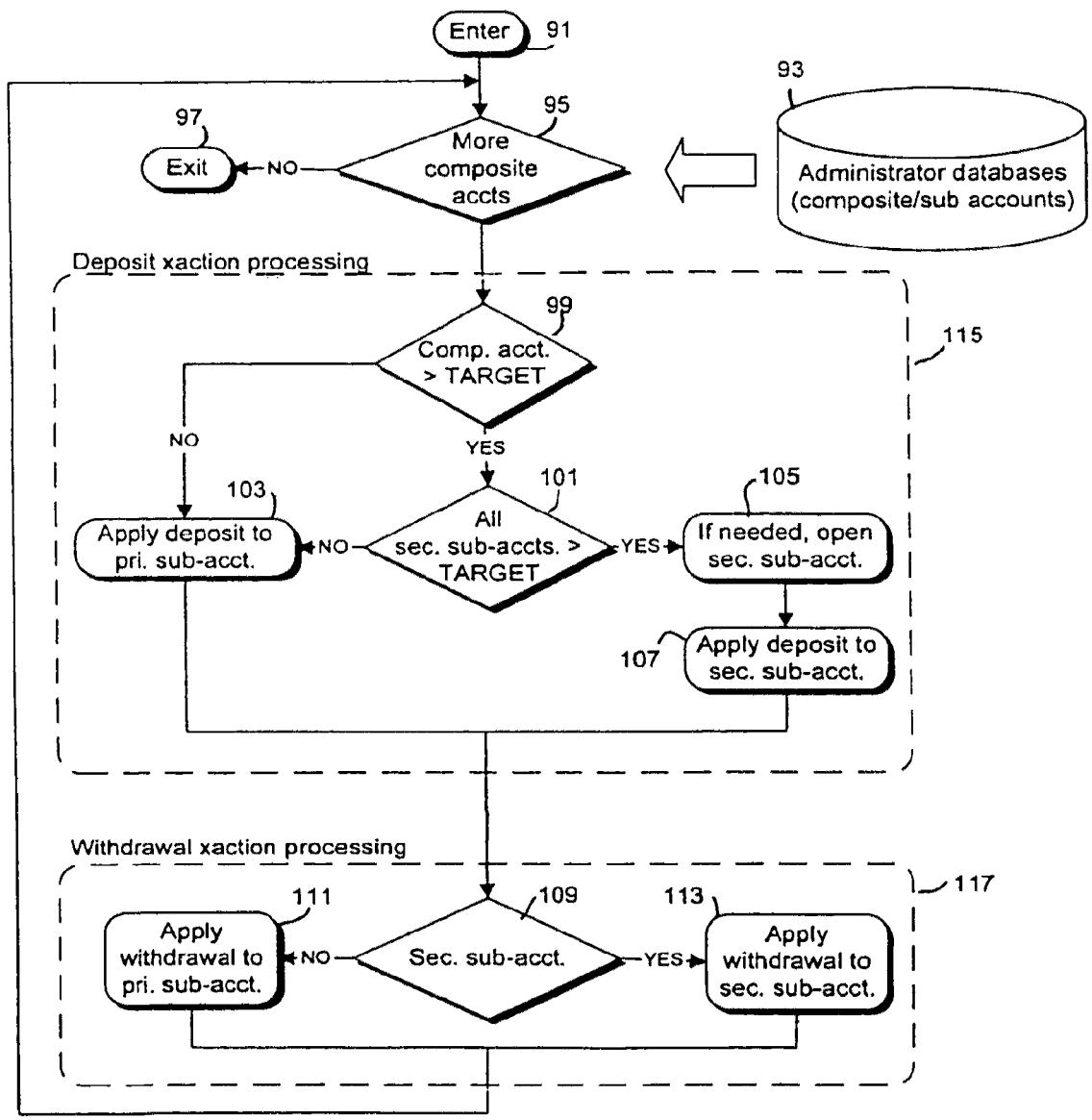
FIG. 4 illustrates post-to-sub-account steps of the periodic processing of this invention.

Next, these individual processing steps illustrated in FIG. 2 will be described in more detail with reference to FIGS. 3, 4, and 5. First, FIG. 3 illustrates file processing step 55 in more detail. This processing commences at step 71, and directly tests 75 for further transaction files 73 to process. If all received transaction files have already been processed, file processing exits 77. Otherwise, file processing tests 79 whether the input data relates to the opening (or availability) of a new participating customer account. If so, the appropriate data structures necessary to manage this account are opened and initialized 81 in the invention's databases. The new data structures include, at least, a new composite customer account and at least one primary sub-account. Secondary sub-accounts may also be opened and initialized at this time if desired. Also, if the new account indication has been received directly by the administrator, it may be necessary to open directly or indirectly a new customer account with the primary financial institution. Otherwise, if the input data relates to daily customer transactions, then these transaction are applied 83 to the customer composite accounts stored in the invention's databases. Transaction are applied or posted in a standard manner as known in the art by recording transaction details in appropriate ledgers along with current balance updates.

After received transactions are applied 55 (FIG. 2) to composite accounts stored in the administrator database, they are allocated and posted to 57 the customer sub-accounts, the balances of which indicate the amount of a customer's funds in each participating institution. FIG. 4 illustrates transaction allocation processing in more detail. After this processing commences at 91, it tests for another unprocessed composite account 95 present in administrator database 93 and processes it if one is present; otherwise transaction allocation processing exits 97. All composite accounts in the administrator database are thereby processed. As illustrated, preferred allocation processing is generally divided into two parts, a first part which processes deposit transactions (or other types of transactions that increase customer composite account balances) 115 followed by a second part which processes withdrawal transactions (or other types of transactions that decrease customer composite account balances) 117. In alternative embodiments the processing order of deposit and withdrawal transactions may be reversed; further, the processing of deposit and withdrawal transactions may be interleaved in the order in which they are retrieved from the composite account.

Deposit transaction processing 115 generally seeks to add new deposits to a customer's primary sub-account in the customer's primary institution if consistent with maximum deposit insurance. Otherwise, new deposits are added to secondary sub-accounts to achieve maximum deposit insurance. Therefore, the existing balance in a customer's composite account (or in the customer's primary sub-account) is tested 99. If the existing balance plus the new deposit will not exceed the target coverage amount, then processing branches to the left at test 99, and the new deposit may be allocated 103 to the customer's primary sub-account. On the other hand, if the existing balance in the primary sub-account plus new deposit exceeds the target coverage amount, processing proceeds to test 101, where the customer's secondary sub-accounts are tested to determine if there is at least one secondary sub-account with an existing balance so that after adding the new deposit to the existing balance the sub-account will remain within the target amount. If there is at least one such secondary sub-account, processing branches at test 101 to the right, and the new deposit is allocated 107 to that sub-account. Also, this right-hand branch is taken where, although all existing secondary sub-accounts are too near the target amount, there exists another secondary institution not yet having a secondary sub-account for this customer. Then, a new secondary sub-account may be opened 105 in that secondary institution and the new deposit may be allocated 107 to that new sub-account.

Further, it may happen that a customer has secondary sub-accounts at all secondary institutions none of which are capable of receiving the new deposit without exceeding the target coverage amount. In this case, in those embodiments where it is preferred to retain a customer's deposits in the customer's primary institution, the left-hand branch from test 101 is taken, and the new deposit is allocated 103 to the primary sub-account. On the other hand, in those embodiments where it is preferred to distribute a customer's excess balance (over the target amount times the number of participating financial institutions) among the secondary institutions (or banks) to reduce risk, processing will branch from test 101 to allocate the new deposit to that secondary sub-account 107 having the smallest existing balance or to the primary sub-account 103 if that account has the smallest current balance.

Withdrawal transaction processing 117, conversely to deposit processing, generally seeks to remove funds from a customer's secondary financial institutions so that the customer's primary institution holds the most customer funds consistent with maximum deposit insurance coverage. Accordingly, withdrawal processing tests 109 if the customer has any secondary sub-accounts with balances sufficient to satisfy the new withdrawal transaction. If so, processing branches to the right at test 109, and the withdrawal is posted 113 to that secondary sub-account. Where even distribution of a customers excess balance evenly among the secondary institutions (or banks) is preferred, new withdrawals may be allocated to the secondary sub-account with the largest balance. Further, if no single subaccount has a sufficient existing balance to cover a new withdrawal, as much as possible of the withdrawal may be covered from two or more (or all) sub-accounts. In this case, one or more (or all) sub-accounts may have be left with zero balances. If the withdrawal cannot be satisfied by reducing all sub-accounts to zero balance, the remainder can be covered by branching to the left and withdrawing funds 111 from the primary account.

Finally, it is often advantageous to split both deposit and withdrawal transactions among sub-accounts, allocating part of a transaction amount to one sub-account and part to another sub-account. For example, this may be guided in order to achieve a better distribution of a customer's excess balances among the secondary sub-accounts or to maximize funds (preferably within the target amount) in the customer's primary sub-account.

Generally, although transaction allocation as described achieves the deposit-insurance-coverage objectives of this invention, it may leave the participating banks or financial institutions out of balance. The second primary objective is that each participating bank be in balance, that is where with the total aggregate of the deposits allocated to each bank equals the total participating deposits of the customers of that bank. The total deposits allocated to a bank equals the sum of the balances of all sub-accounts allocated to and held by that bank, whether or not the sub-accounts are associated with customers of that bank; the bank's total participating funds equals the sum of the balances of the composite accounts of all the customers of that bank. It is convenient in the following to use the term "net difference" to stand for the difference of these two sums, namely, the sum of the composite account balances subtracted from the sum of the balances of the allocated subaccount balances. Then a bank is said to be in surplus if its net difference is positive; a bank is in balance if its net difference is substantially zero; and a bank is in deficit if its net difference is negative.

The following example, including three banks, Bank A, Bank B, and Bank C and presented in Tables 5-7, illustrates that the results of transaction allocation may lead to need for funds re-allocation. First, Table 5 illustrates exemplary results of a just-completed transaction allocation for the present processing period. (Parenthesis enclosing an amount indicates that the amount is negative.) Here, Bank A started with $100M in aggregate total deposits as of the end of the previous regular processing. Bank A's transaction file for the current processing day is equal to $8M. Therefore, it has increased its aggregate deposit balances by $8M. The transaction allocation for the present processing period leads to a net of $8M in new deposits allocated to all the sub-accounts held at Bank A. Of this $8M of new net deposits, customers of Bank A have generated a net of $8M of new deposits; customers of Bank B have generated $2M of net withdrawals; and customers of Bank C have generated $2M of new deposits. These nets are consistent because $8M=$8M−$2M+$2M. Therefore, Bank A's net difference is zero. The data for Banks B and C are similarly interpreted. Note that the transactions allocated and posted to the sub-accounts held at a specific bank may or may not be in the transaction file sent by that bank, since not all subaccounts held at the bank are for customers of the bank.

TABLE 5

|  | BANK | | |
|---|---|---|---|
|  | A | B | C |
| Bank deposits as of the previous day | $100M | $50M | $30M |
| Net transactions allocated to bank from all received transaction files | $8M | $6M | $3M |
| Breakdown of net transactions by customers of bank | A = $8M; B = ($2M); C = $2M | A = ($2M); B = $6M; C = $2M | A = $2M; B = ($1M); C = $2M |

Next, Table 6 presents that same data as Table 5 organized by the customers of each bank instead of by bank.

TABLE 6

| Customers of BANK | Total net transactions of bank customers | Net transactions in sub-accounts allocated to BANK | | |
|---|---|---|---|---|
|  |  | A | B | C |
| A | $8M | $8M | ($2M) | $2M |
| B | $3M | ($2M) | $6M | ($1M) |
| C | $6M | $2M | $2M | $2M |
| Total net transactions for sub-accounts allocated to this bank |  | $8M | $6M | $3M |

For example, customers of Bank B have generated a net deposit of $3M, which results in an increase of the sum of their composite accounts by this amount. This net represents $2M of net withdrawals from Bank-B's secondary sub-accounts that are held at Bank A, $6M of net deposits in Bank-B's primary sub-accounts held at Bank B, and $1M of net withdrawals from Bank-B's secondary sub-accounts that are held at Bank C. Again, these nets are consistent because $3M=−$2M+$6M−$1M. The data for customers of Banks A and C are similarly interpreted Finally, Table 7 illustrates determination of the surplus/deficit status of the participating bank and the funds re-allocation needed (assuming the banks were all initially in balance). For example, Bank C has experienced a $3M increase in aggregate participating deposits, because $3M in customer transactions were allocated to it as indicated in Table 5. However, Table 6 indicates that the customers of Bank C generated $6M in net deposits. Therefore, Bank C has a negative net_difference, or deficit, of $3M; $3M needs to be transferred into Bank C from Banks A and B so that its aggregate deposits equals the aggregate deposits of its customers. Similar interpretation of the results for Banks A and B indicate that Bank A remains in balance while Bank B has a positive net_difference, or surplus, of $3M. All the banks will be in balance again after a funds transfer of $3M from Bank B to Bank C.

TABLE 7

|  | BANK | | |
|---|---|---|---|
|  | A | B | C |
| Aggregate bank deposits on previous day | $100M | $50M | $30M |
| Change in sub-accounts attached to the bank at end of this day (=net transactions allocated to this bank) | $8M | $6M | $3M |

TABLE 7-continued

|  | BANK | | |
| --- | --- | --- | --- |
|  | A | B | C |
| Change in aggregate deposits of all customers of this bank (=net transactions of all customers of this bank) | $8M | $3M | $6M |
| Status (net_difference) | Balanced | Surplus of $3M | Deficit of $3M |
| Re-allocation needed | $0 | ($3M) | $3M |

In summary, funds re-allocation is usually needed because the net transaction balances allocated to a bank usually does not equal the net transaction balances of the bank's customers (or customers of its affiliated or associated participating financial institution).

Figure 5:
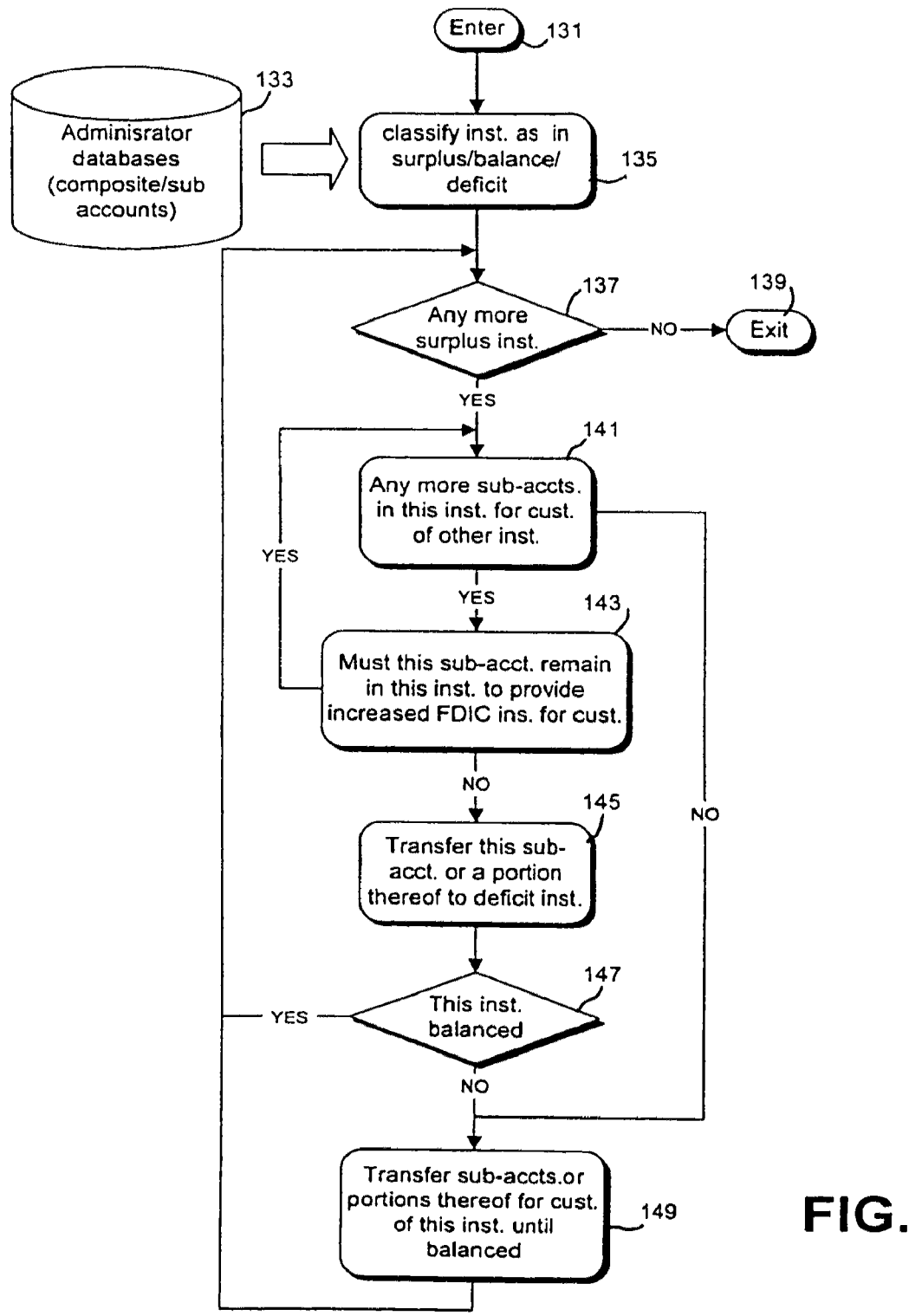
FIG. 5 illustrates re-allocation-processing steps of the periodic processing of this invention.

Now returning to this invention's processing methods, FIG. 5 illustrates funds reallocation processing, step 59 (FIG. 2), in more detail in view of the prior example. After commencing 131, classification step 135 retrieves data from administrator databases 133, which store composite account and sub-account records, and classifies all participating financial institutions (for example, participating banks) as being in surplus, in balance, or in deficit according to the net_difference definition above. This classification is processed in a fashion analogous to the exemplary classification of Banks A, B, and C in the prior example. After surplus/balance/deficit classification 135, re-allocation processing determines 137 if there are any institutions are in surplus. Processing exits 139 if no further institutions are in surplus, because if there are no institutions in surplus, then all institutions are in balance. Any institution that is in deficit means that there are one or more other institutions in surplus, and conversely. (Similarly, processing may determine if there are any institutions in deficit.) However, if at least one institutions is still in surplus (and thus one or more are still in deficit), re-allocation processing must continue.

Re-allocation processing seeks to transfer sub-account balances from surplus institutions to deficit institutions until all are in balance. Secondary sub-accounts are preferentially transferred out of a surplus institution to a deficit institution; however, if transfer of all secondary sub-accounts does not achieve balance, then primary sub-accounts, that is sub-accounts for customers of the surplus institution, are also transferred. Therefore, processing next finds 141 secondary sub-accounts at a surplus institution (which it should be recalled are sub-accounts for individuals who are not customers of that surplus institution). Certain secondary sub-accounts are "fixed," and may not be transferred to an in-deficit institution. For example, a candidate secondary sub-account may not be transferred if transfer of part or all of its current balance will decrease insurance coverage for that subaccount's owner. This will occur, for example, if the existing balances of that customer's sub-accounts at the currently in-deficit institutions are too close to (or are at) the target amount, and cannot accommodate funds from the candidate secondary sub-account. Test 143 bypasses all such "fixed" sub-accounts.

Having found a sub-account eligible for transfer, all of part is transferred 145 to an in-deficit institution. If the current in-surplus institution may be balanced by transfer of only a part of the eligible sub-account, the necessary part is transferred leaving the institution now in balance. Otherwise, the entire sub-account is transferred. Alternatively, as much as possible of the sub-account is transferred without causing a decrease in that customer's insurance coverage. If the current in-surplus institution is now in balance 147, re-allocation processing checks again 137 for another in-surplus institution. However, if transfer of all possible funds from secondary sub-accounts does not balance the current in-surplus institution, then funds will be transferred from one or more primary sub-accounts. Primary sub-accounts are selected and processed for transfer 149 in a fashion analogous to that for secondary subaccounts. However, transfers that will decrease insurance coverage for the account's owner are not allowed.

Transfers of funds preferably are determined to leave the financial institutions exactly in balance with a net_difference of zero. However, in certain embodiments it may not be possible to exactly balance institutions because of, for example, funds transfer restrictions, timing differences between transaction processing and funds transfer, and the like. In such embodiments, financial institutions should be substantially in balance by having the net_difference to be no more than 5%, or 2%, or 1%, or 0.5%, or 0.1% of the total customer account balances.

Additionally, the methods of this invention preferably generate customer statements that display the customer transaction activity posted to the composite account along with the customer's balances (in sub-accounts) held at each participating financial institution or bank. These statements are usually generated monthly.

Systems Preferred for this Invention

Figure 6:
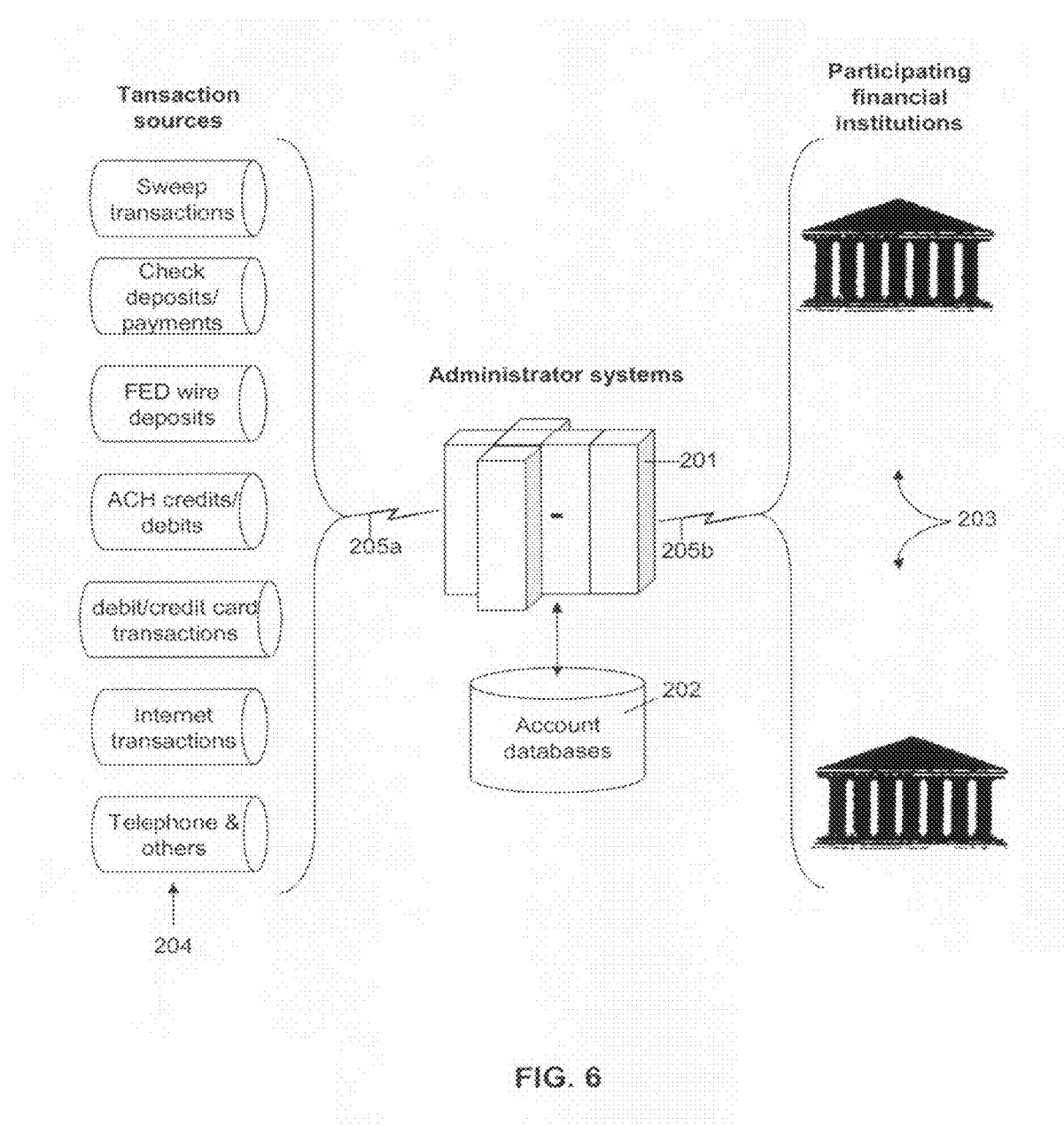
FIG. 6 illustrates exemplary systems for practicing the present invention.

FIG. 6 generally illustrates exemplary administrator systems of this invention, which, along with certain external system with which the administrator systems cooperate, are for performing the above-described methods of this invention. Computer system 201, including processing unit, memory, communication interface, user interfaces, and the like, is configured with a performance and reliability acceptable for financial processing as is known in the arts. For example, such computers along with industrial-strength operating software are available from IBM and other well known manufacturers. Administrator systems also include database storage 202, preferably highly reliable, for storing account data, including composite account data, sub-account data, MMDA-DDA account-pair data, and such other administrative data needed for customer funds management.

The methods of this system are programmed, preferably in a suitable, commercial or financial programming language, and translated into machine instructions which cause computer 201 and its operating software and database 202 to perform this invention's methods. This invention also includes program products comprising computer readable media containing encoded representations of such machine instructions. Such computer readable media are well known in the art (and include network distribution).

In order to perform this invention's methods, the administrator systems are preferably in communication with external systems which provide important data, such as sources 204 of customer transaction data. This invention includes processing, posting, and allocation of various types of customer transactions, for example, ACH credit/debit transactions, debit and credit card transactions, sweep transaction from participating financial institutions, check/draft payments and deposits, FED wire transfers, and transactions originating over the telephone, the internet, in person, and so forth. Generally, as known in the art, different transaction types originate from different external systems, and may arrive transaction-by-transaction or may be batched into periodic (e.g., daily) transaction files.

In most embodiments, the administrator systems are in communication with external systems 203 of the participating financial institutions. For participating banking institutions, both customer account information and MMDA-DDA account-pair information may be exchanged with their external systems 203. For other types of participating financial institutions, primarily customer account information is exchanged, while related MMDA-DDA account-pair information is exchanges with the systems of that institutions affiliated or associated bank. In certain embodiments, one or more of the participating financial institutions may directly receive customer transactions and then exchange them with the administrator systems as a batch file. Accordingly, communications between the administrator systems, the transaction source systems, and the participating financial institution systems may be direct or indirect.

Finally, communication links 205*a* and 205*b* between these systems may be of the many types known in the art. They may be private links that are used only for the purposes of this invention. Alternatively, these links may be shared as part of private clearing house networks, of bank card networks, of Federal Reserve Board networks, and the like. As also known in the art. these links may be, configured as point-to-point links, or a networks, or a networks of networks, such as the Internet.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. A number of references are cited herein, the entire disclosures of which are incorporated herein, in their entirety, by reference for all purposes. Further, none of these references, regardless of how characterized above, is admitted as prior to the invention of the subject matter claimed herein.

What is claimed is:

1. A system for managing funds, in a plurality of financial institutions participating in a program, for a plurality of primary client transaction accounts of a plurality of primary clients, with each respective primary client having funds that were accepted for deposit in a primary client transaction account held in the name of the primary client at one of the plurality of financial institutions in the program, with that financial institution referred to as a primary financial institution for that primary client, comprising:

one or more electronic databases, stored on one or more computer-readable media, comprising:
　　(1) aggregated transaction account information for a plurality of Federal Deposit Insurance Corporation (FDIC)-insured and interest-bearing aggregated deposit accounts held in a plurality of financial institutions, N, in a program, wherein funds from client transaction accounts of a plurality of clients are aggregated with funds of other client transaction accounts in the aggregated deposit accounts held in the financial institutions in the program, comprising for respective of the aggregated deposit accounts a respective balance of funds held in the respective aggregated deposit account; and
　　(2) client transaction account information for each of the respective client transaction accounts comprising:
　　　(a) respective balance of a respective client's funds managed in the program;
　　　(b) transaction data for a plurality of the clients; and
　　　(c) a respective balance of client's funds held in each of said plurality of the insured and interest-bearing aggregated deposit accounts holding funds of the respective client;
　a first computation engine configured on the one or more computers that are operably connected to the one or more databases, for computing, for each of a plurality of respective primary client transaction accounts, a respective excess amount by which a balance of funds from that client transaction account managed in the program exceeds a specified amount;
　a first allocation engine configured on the one or more computers, for allocating a plurality of the respective excess amounts associated with one of the financial institution, to one or more of the aggregated deposit accounts in one or more other of the financial institutions, with each respective excess amount allocated associated with a different respective primary client transaction account of the one financial institution;
　a second computation engine configured on the one or more computers, for determining a first amount comprising a sum of a plurality of the excess amounts determined for a plurality of primary client transaction accounts in the one financial institution that were or are to be allocated to one or more of the aggregated deposit accounts in the one or more of the other financial institutions;
　a second allocation engine configured on the one or more computers, for allocating to the one financial institution a second amount of funds comprising funds associated with more than one primary client transaction account of one or more of the other financial institutions from one or more of the aggregated deposit accounts at one or more of the other financial institutions, with the second amount based at least in part on a difference between a sum of the respective one or more balances of funds held in the one or more aggregated deposit accounts of the one financial institution associated with the program and a sum of current balances managed in the program from the primary client transaction accounts of the primary clients in the program associated with the one financial institution;
　an update engine configured in the one or more computers, for updating or having updated, in the one or more electronic databases, the balance of funds managed in the program from the primary client transaction accounts and an amount or respective amounts of such funds held in one or more of the plurality of aggregated deposit accounts in the plurality of financial institutions based on operations of the first and second allocation engines and the second computation engine; and
　an instruction generator configured on the one or more computers, for generating one or more amounts to be transferred between aggregated deposit accounts based at least in part on results of one or more of the operations of the first and second allocation engines.

2. The system as defined in claim 1, wherein the second amount allocated is approximately equal to the difference between the sum of current balances managed in the program from the primary client transaction accounts associated with the one financial institution and funds deposited in the one or more aggregated deposit accounts of the one financial institution.

3. The system as defined in claim 1, wherein the second amount allocated is greater than the difference between the sum of current balances managed in the program from the primary client transaction accounts associated with the one financial institution and funds deposited in the one or more aggregated deposit accounts of the one financial institution.

4. The system as defined in claim 1, wherein the second amount allocated is less than the difference between the sum of current balances managed in the program from the primary client transaction accounts associated with the one financial institution and funds deposited in the one or more aggregated deposit accounts of the one financial institution.

5. The system as defined in claim 1, further comprising:
a communication component configured on the one or more computers, for receiving via an electronic communication at least one debit or withdrawal transaction from an external system, wherein the external system is for one or more selected from the group consisting of ACH debit transactions, debit and credit card transactions, sweep transactions from financial institutions, check/draft payments, FED wire transfers, transactions originating over the telephone or the internet, for one of the primary clients of the one financial institution who also has funds in one or more of the aggregated deposit accounts in one or more of the other financial institutions; and
the one or more computers configured for issuing at least one instruction to transfer funds in accordance with the at least one transaction; and
the one or more computers configured for reallocating an amount of funds from one or more of the aggregated deposit accounts at the one or more of the other financial institutions to the at least one aggregated deposit account in the one financial institution to maximize funds of the one primary client held in the one financial institution but with the balance of those funds in the one financial institution remaining equal to or less than the specified amount.

6. The system as defined in claim 1, further comprising:
a communication component configured on the one or more computers, for receiving via an electronic communication at least one debit or withdrawal transaction from an external system, wherein the external system is one or more selected from the group consisting of ACH debit transactions, debit and credit card transactions sweep transactions from financial institutions, check/draft payments, FED wire transfers, transactions originating over the telephone or the internet, for one of the primary clients of the one financial institution who also has funds in one or more of the aggregated deposit accounts in one or more of the other financial institutions;
the one for more computers configured for selecting one of the aggregated deposit accounts in one of the other financial institutions holding funds of the one client; and
the one or more computers configured for reallocating an amount of funds from the selected aggregated deposit account at the one other financial institution for the at least one transaction to the at least one aggregated deposit account in the one financial institution.

7. The system as defined in claim 1, further comprising:
the one or more computers configured for transferring or having transferred funds between the financial institutions based at least in part on results of one or more of the allocating steps.

8. The system as defined in claim 1,
wherein the second allocation engine on the one or more computers is configured for performing the allocation of the second amount only after the difference equals or exceeds a threshold amount.

9. The system as defined in claim 1, further comprising:
a selection engine configured on the one or more computers, for selecting one of the other financial institutions for allocation by the second allocation engine based at least in part on an amount of the difference between a sum of the funds deposited in the one or more aggregated deposit accounts of the one other financial institution associated with the program and a sum of current balances managed in the program from the primary client transaction accounts of the primary clients in the program associated with the one other financial institution.

10. The system as defined in claim 1, wherein said specified amount is more than said maximum FDIC insurance coverage minus a predetermined amount but less than or equal to said maximum FDIC insurance coverage.

11. The system as defined in claim 1,
wherein one or more of the electronic databases includes primary client preference and/or exclusion information comprising a primary client's one or more preferences and/or one or more exclusions of one or more financial institutions to hold its funds; and
the one or more computers configured for allocating funds of the respective primary client to one or more of the plurality of aggregated deposit accounts in the plurality of financial institutions in dependence at least in part on the primary client's preferences.

12. The system as defined in claim 1, further comprising the one or more computers configured for authorizing or rejecting payments requested from at least one client transaction account based, at least in part, on the balance managed in the program from the respective primary client transaction account.

13. The system as defined in claim 1, further comprising:
the one or more computers configured for receiving electronic client transaction data associated with debit and/or credit transactions made by the primary clients against their respective primary client transaction accounts;
the one or more computers configured for determining or having determined or receiving electronically for each of a plurality of the primary client transaction accounts, an updated balance of funds managed in the program from the primary client transaction accounts; and
the one or more computers configured for performing the allocating operation based on the updated balance of funds for the respective primary clients.

14. The system as defined in claim 1, further comprising:
the one or more computers configured for adding new deposits from one of the respective primary clients of one of the financial institutions to one of more of the aggregated deposit accounts in the one financial institution, unless an amount of funds held by the respective primary client in the program in the one financial institution equals or exceeds a specified amount.

15. The system as defined in claim 1, further comprising:
a communication component configured on the one or more computers, for receiving via an electronic communication at least one debit or withdrawal transaction from an external system, wherein the external system is for one or more selected from the group consisting of ACH debit transactions, debit and credit card transactions, sweep transactions from financial institutions, check/draft payments, FED wire transfers, transactions originating over the telephone or the internet, for one of the primary clients of the one financial institution who also has funds in one or more of the aggregated deposit accounts in one or more of the other financial institutions; and the one or more computers configured for issuing at least one instruction to withdraw and/or transfer funds from one or more of the aggregated deposit accounts held in one or more of the financial institutions in accordance with the at least one transaction, with the instruction to be delivered by the one or more selected from the group of by messenger, by mail, by automated teller machine, and requested by telephone and distributed by mail.

* * * * *